US011010421B2

(12) United States Patent
Yada et al.

(10) Patent No.: US 11,010,421 B2
(45) Date of Patent: May 18, 2021

(54) TECHNIQUES FOR MODIFYING A QUERY IMAGE

(71) Applicant: Microsoft Technology Licensing, LLC, Redmond, WA (US)

(72) Inventors: Ravi Theja Yada, Newcastle, WA (US); Yan Wang, Mercer Island, WA (US); Nikita Astrakhantsev, Bellevue, WA (US); Arun Sacheti, Sammamish, WA (US)

(73) Assignee: Microsoft Technology Licensing, LLC, Redmond, WA (US)

( * ) Notice: Subject to any disclaimer, the term of this patent is extended or adjusted under 35 U.S.C. 154(b) by 89 days.

(21) Appl. No.: 16/408,192

(22) Filed: May 9, 2019

(65) Prior Publication Data

US 2020/0356591 A1 Nov. 12, 2020

(51) Int. Cl.
*G06F 16/532* (2019.01)
*G06N 20/20* (2019.01)
*G06F 16/54* (2019.01)
*G06F 16/56* (2019.01)
*G06N 3/08* (2006.01)
*G06F 16/583* (2019.01)
*G06F 3/0485* (2013.01)

(52) U.S. Cl.
CPC ........ *G06F 16/532* (2019.01); *G06F 3/04855* (2013.01); *G06F 16/54* (2019.01); *G06F 16/56* (2019.01); *G06F 16/5846* (2019.01); *G06F 16/5862* (2019.01); *G06N 3/08* (2013.01); *G06N 20/20* (2019.01)

(58) Field of Classification Search
CPC .............. G06F 16/5866; G06F 16/583; G06F 16/5838; G06F 16/532; G06F 16/5846; G06F 3/0482; G06N 3/08; G06N 20/20

USPC ....................................................... 707/769
See application file for complete search history.

(56) References Cited

U.S. PATENT DOCUMENTS

| 10,074,200 B1 | 9/2018 | Yeturu |
| 2011/0072048 A1 | 3/2011 | Hua et al. |
| 2017/0098152 A1 | 4/2017 | Kerr et al. |

(Continued)

FOREIGN PATENT DOCUMENTS

WO 2019/011936 A1 1/2019

OTHER PUBLICATIONS

Fang, et al., "From Captions to Visual Concepts and Back," arXiv:1411. 4952v3 [cs.CV], Apr. 14, 2015, 10 pages.

(Continued)

*Primary Examiner* — Robert W Beausoliel, Jr.
*Assistant Examiner* — Pedro J Santos

(57) ABSTRACT

A computer-implemented technique is described herein for performing an image-based search that allows a user to create a custom query image that expresses the user's search intent. The technique generates the query image based on one or more input images and/or one or more information items that describe at least one desired characteristic of the query image. The technique then submits the query image to a search engine, and, in response, receives a set of candidate images that match the query image. In one implementation, the technique constructs the query image using a decoder neural network that operates on a mixed latent variable vector. In one approach, the technique uses a generative adversarial network (GAN) to produce the decoder neural network.

19 Claims, 14 Drawing Sheets

(56) References Cited

U.S. PATENT DOCUMENTS

| | | |
|---|---|---|
| 2018/0137551 A1 | 5/2018 | Zheng et al. |
| 2019/0027147 A1 | 1/2019 | Diamant et al. |
| 2019/0354802 A1* | 11/2019 | Lin .................... G06K 9/4628 |
| 2020/0226411 A1 | 7/2020 | Gupta et al. |

OTHER PUBLICATIONS

Ren, et al., "Faster R-CNN: Towards Real-Time Object Detection with Region Proposal Networks," arXiv:1506.01497v3 [cs.CV], Jan. 6, 2016, 14 pages.

Krizhevsky, et al., "ImageNet Classification with Deep Convolutional Neural Networks," in Advances in Neural Information Processing Systems 25 (NIPS 2012), 2012, 9 pages.

Radford, et al., "Unsupervised Representation Learning with Deep Convolutional Generative Adversarial Networks," arXiv:1511.06434v2 [cs.LG], Jan. 7, 2016, 16 pages.

Lin, et al., "Focal Loss for Dense Object Detection," arXiv:1708.02002v2 [cs.CV], Feb. 7, 2018, 10 pages.

Liu, et al., "SSD: Single Shot MultiBox Detector," arXiv:1512.02325v5 [cs.CV], Dec. 29, 2016, 17 pages.

Goodfellow, et al., "Generative Adversarial Nets," arXiv:1406.2661v1 [stat.ML], Jun. 10, 2014, 9 pages.

PCT Search Report and Written Opinion for PCT Application No. PCT/US2020/023055, dated Jun. 8, 2020, 15 pages.

Dong, et al., "Semantic Image Synthesis via Adversarial Learning," in IEEE International Conference on Computer Vision (ICCV), Oct. 2017, pp. 5707-5715.

* cited by examiner

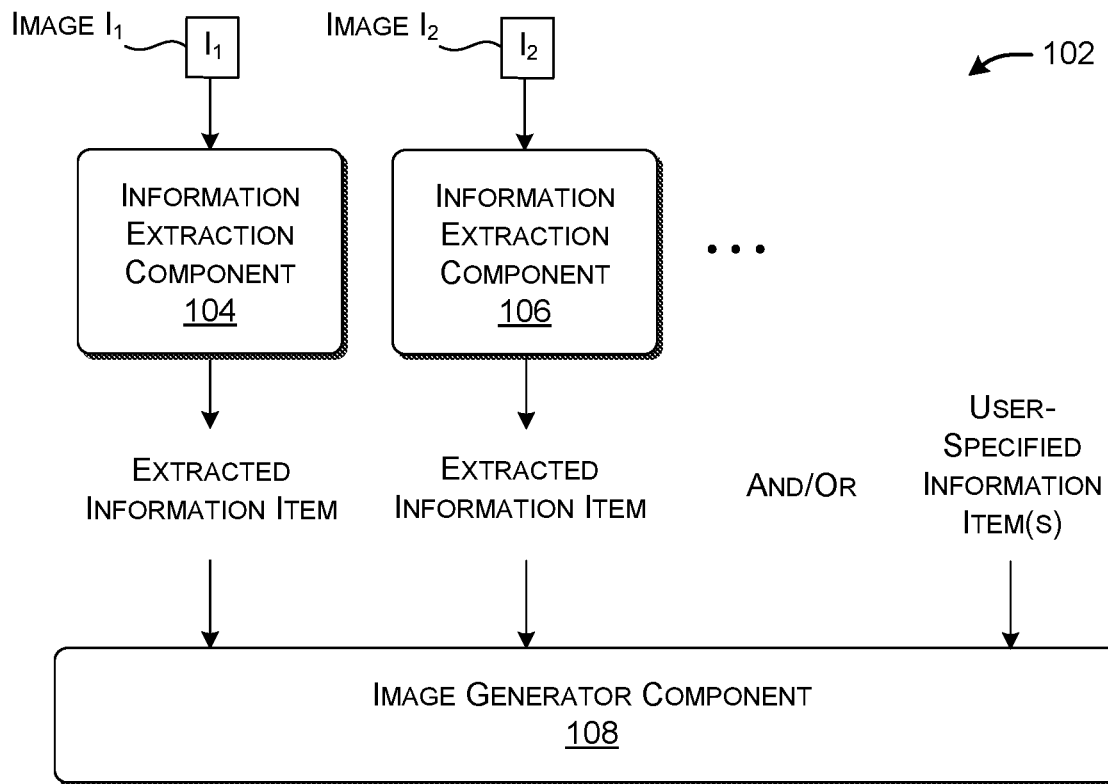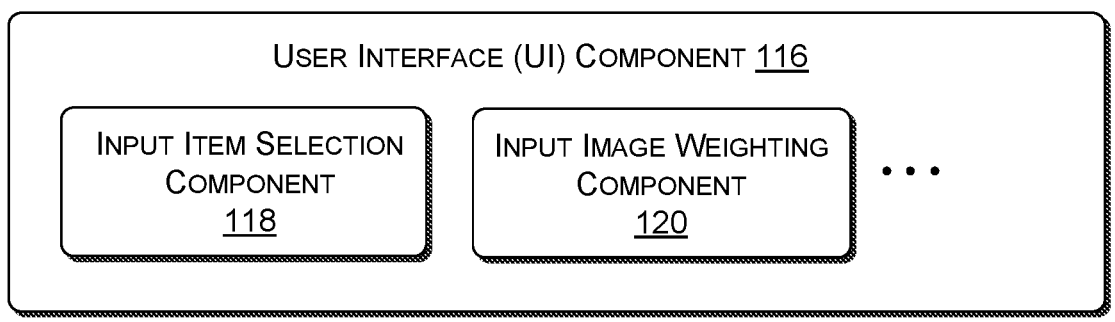
FIG. 1

OVERVIEW OF OPERATION OF THE COMPUTING ENVIRONMENT 1602

RECEIVE AT LEAST A FIRST INPUT IMAGE AND A SECOND INPUT IMAGE IN RESPONSE TO SELECTION OF THE FIRST INPUT IMAGE AND THE SECOND INPUT IMAGE BY A USER.
1604

OPTIONALLY RECEIVE AT LEAST ONE WEIGHTING VALUE IN RESPONSE TO A SELECTION MADE THE USER BY INTERACTING WITH A GRAPHICAL CONTROL PROVIDED A USER INTERFACE PRESENTATION.
1606

USE AN ENCODER TO PRODUCE A FIRST LATENT VARIABLE VECTOR BASED ON THE FIRST INPUT IMAGE.
1608

USE AN ENCODER TO PRODUCE A SECOND LATENT VARIABLE VECTOR BASED ON THE SECOND INPUT IMAGE.
1610

COMBINE THE FIRST LATENT VARIABLE VECTOR AND AT LEAST THE SECOND LATENT VARIABLE VECTOR TO PRODUCE A MIXED LATENT VARIABLE VECTOR, THE COMBINING BEING INFLUENCED BY THE AT LEAST ONE WEIGHTING VALUE (IF USED).
1612

TECHNIQUES FOR MODIFYING A QUERY IMAGE

BACKGROUND

An image-based search engine allows a user to submit a query in the form of an input image. The image-based search engine identifies one or more candidate images that show similar content to the input image. This type of search engine, however, has various limitations stemming from its inflexibility.

SUMMARY

A computer-implemented technique is described herein for performing an image-based search that allows a user to craft a custom query image that expresses the user's search intent, rather than accept an input query image as a fixed given. The technique generates the query image based on one or more user-supplied input images and/or one or more user-supplied information items that describe at least one desired characteristic of the query image. The technique then submits the query image to a search engine, and, in response, receives a set of candidate images that match the query image.

In one implementation, the technique constructs the query image using a decoder neural network that operates on a mixed latent variable vector. The technique produces the mixed latent variable vector, in turn, by: using an encoder to produce a first latent variable vector based on a first input image; using the encoder to produce a second latent variable vector based on a second input image; and then combining the first latent variable vector with the second latent variable vector to produce the mixed latent variable vector.

According to another illustrative aspect, the technique includes various graphical controls that allow a user to specify weighting values to be applied to one or more input images.

According to another illustrative aspect, the technique produces the decoder neural network using a generative adversarial network (GAN). Alternatively, the technique can produce both an encoder neural network and the decoder neural network by training a variational autoencoder (VAE) or a flow-based neural network system.

The above-summarized technique can be manifested in various types of systems, devices, components, methods, computer-readable storage media, data structures, graphical user interface presentations, articles of manufacture, and so on.

This Summary is provided to introduce a selection of concepts in a simplified form; these concepts are further described below in the Detailed Description. This Summary is not intended to identify key features or essential features of the claimed subject matter, nor is it intended to be used to limit the scope of the claimed subject matter.

BRIEF DESCRIPTION OF THE DRAWINGS

FIG. 1 shows an illustrative computing environment for producing an image-based query and for using the image-based query to conduct a search.

FIGS. 16 and 17 together show a process that represents an overview of the operation of the ML computing environment of FIG. 3.

Figure 2:
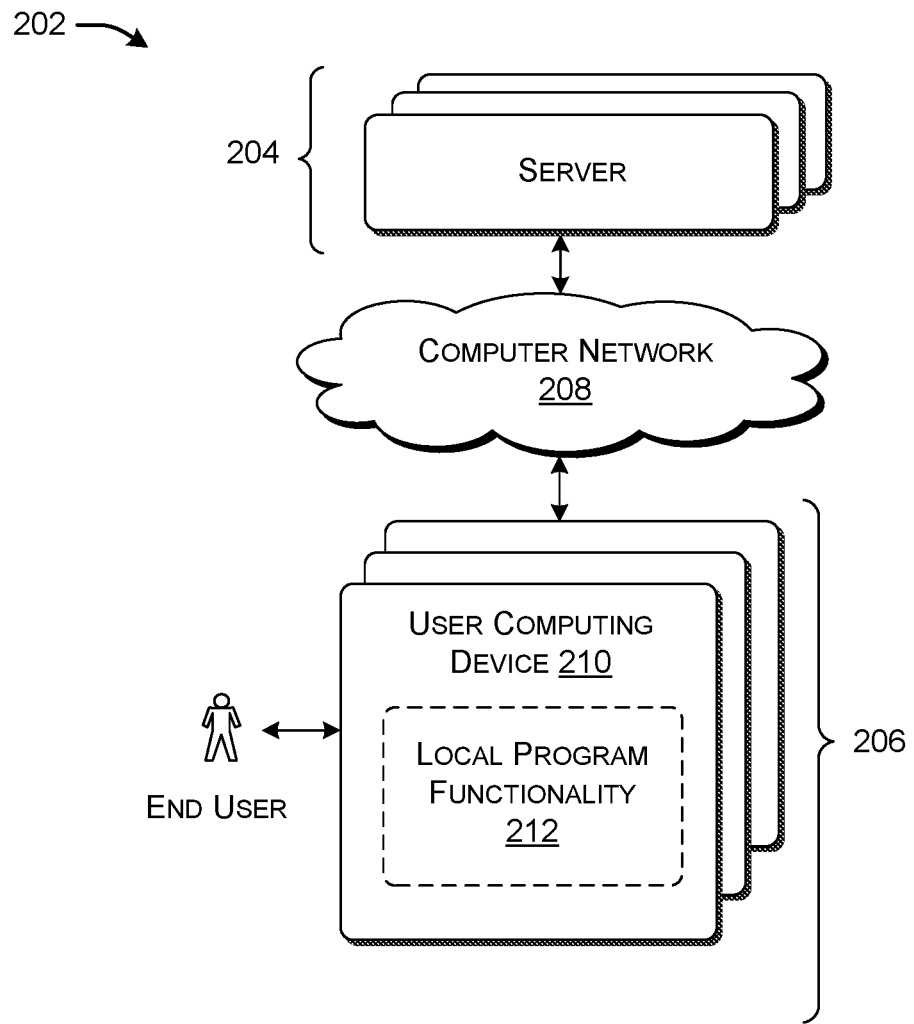
FIG. 2 shows equipment that can be used to implement the computing environment of FIG. 1.

The same numbers are used throughout the disclosure and figures to reference like components and features. Series 100 numbers refer to features originally found in FIG. 1, series 200 numbers refer to features originally found in FIG. 2, series 300 numbers refer to features originally found in FIG. 3, and so on.

DETAILED DESCRIPTION

This disclosure is organized as follows. Section A describes a computing environment for assisting a user in constructing an image-based query. Section B sets forth illustrative methods that explain the operation of the computing environment of Section A. And Section C describes illustrative computing functionality that can be used to implement any aspect of the features described in Sections A and B.

As a preliminary matter, the term "hardware logic circuitry" corresponds to one or more hardware processors (e.g., CPUs, GPUs, etc.) that execute machine-readable instructions stored in a memory, and/or one or more other hardware logic units (e.g., FPGAs) that perform operations using a task-specific collection of fixed and/or programmable logic gates. Section C provides additional information regarding one implementation of the hardware logic circuitry. In certain contexts, each of the terms "component" and "engine" refers to a part of the hardware logic circuitry that performs a particular function.

In one case, the illustrated separation of various parts in the figures into distinct units may reflect the use of corresponding distinct physical and tangible parts in an actual implementation. Alternatively, or in addition, any single part illustrated in the figures may be implemented by plural actual physical parts. Alternatively, or in addition, the depiction of any two or more separate parts in the figures may reflect different functions performed by a single actual physical part.

Other figures describe the concepts in flowchart form. In this form, certain operations are described as constituting distinct blocks performed in a certain order. Such implementations are illustrative and non-limiting. Certain blocks described herein can be grouped together and performed in a single operation, certain blocks can be broken apart into plural component blocks, and certain blocks can be performed in an order that differs from that which is illustrated herein (including a parallel manner of performing the blocks). In one implementation, the blocks shown in the flowcharts that pertain to processing-related functions can be implemented by the hardware logic circuitry described in Section C, which, in turn, can be implemented by one or more hardware processors and/or other logic units that include a task-specific collection of logic gates.

As to terminology, the phrase "configured to" encompasses various physical and tangible mechanisms for performing an identified operation. The mechanisms can be configured to perform an operation using the hardware logic circuitry of Section C. The term "logic" likewise encompasses various physical and tangible mechanisms for performing a task. For instance, each processing-related operation illustrated in the flowcharts corresponds to a logic component for performing that operation. A logic component can perform its operation using the hardware logic circuitry of Section C. When implemented by computing equipment, a logic component represents an electrical element that is a physical part of the computing system, in whatever manner implemented.

Any of the storage resources described herein, or any combination of the storage resources, may be regarded as a computer-readable medium. In many cases, a computer-readable medium represents some form of physical and tangible entity. The term computer-readable medium also encompasses propagated signals, e.g., transmitted or received via a physical conduit and/or air or other wireless medium, etc. However, the specific term "computer-readable storage medium" expressly excludes propagated signals per se, while including all other forms of computer-readable media.

The following explanation may identify one or more features as "optional." This type of statement is not to be interpreted as an exhaustive indication of features that may be considered optional; that is, other features can be considered as optional, although not explicitly identified in the text. Further, any description of a single entity is not intended to preclude the use of plural such entities; similarly, a description of plural entities is not intended to preclude the use of a single entity. Further, while the description may explain certain features as alternative ways of carrying out identified functions or implementing identified mechanisms, the features can also be combined together in any combination. Finally, the terms "exemplary" or "illustrative" refer to one implementation among potentially many implementations.

A. Illustrative Computing Environment

A traditional text-based search engine allows a user to progressively refine his or her search until the user obtains satisfactory search results. For example, consider a user who wishes to discover the day on which Thanksgiving will fall within a particular year. The user may begin his search by entering the keyword "Thanksgiving." A text-based search engine, however, will likely respond to this query by identifying a general-purpose article regarding the Thanksgiving holiday, which does not answer the user's question. The user may next enter the key phrase "Thanksgiving 2019." This revised query may provide results that answer the user's question.

A traditional image-based search offers a different search experience. Here, a user performs a search in a single-shot fashion. That is, the user selects an image that best conveys his search intent, and submits it to an image-based search engine. The engine will provide a set of candidate images that match the user's image-based query. If these results do not provide desirable results, the user may decide to start over by finding another input image and submitting that image to the image-based search engine. In other words, in this scenario, the image-based search engine provides no mechanism that allows the user to revise previously-submitted images. The user may find this hit-or-miss approach to image retrieval time-consuming and inefficient. Insofar as it may result in a prolonged search session, it also makes inefficient use of computing resources.

FIG. 1 shows a computing environment 102 that addresses at least the above problem by allowing a user to craft a custom query image, and, if desired, later revise that query image. The computing environment 102 generates the custom query image based on one or more input images. A user may provide the input images using one or more techniques. In one scenario, a user may provide each input image by selecting the image within a larger collection of images. For instance, the user may identify an input image by clicking on a thumbnail representation associated with it within a larger collection of thumbnail representations. Or the user may identify an input image by clicking on it within a content item in which it appears, such as a web page, document, video stream, etc.

In yet another scenario, the user may provide an input image by taking a digital photograph of an object-of-interest ("object") using a camera. For instance, the user may take a picture of the object (such as a product, landmark, etc.) with the intent of retrieving information regarding the object. Or the user may take plural digital photographs of the object from one or more perspectives relative to the object. The user may perform this task by moving to different picture-taking locations relative to the object. Or the user may rely on a system that uses plural cameras positioned at different angles relative to the object. The user can synchronize the cameras to take pictures of the object at the same time.

In yet another scenario, the user may indirectly specify an input image by describing one or more of its characteristics. For example, assume that the user wishes to apply an input image that shows a particular fabric pattern. The user may specify that image by providing a text-based description of the fabric pattern, such as by specifying "large hound's-tooth," "wide stripes," "paisley," etc. The computing environment 102 can then map the text-based description into an input image or some representation thereof. For example, the computing environment 102 can submit the text-based description to a search engine (described below). The search engine can then perform a search based on the user's text-based description, to provide a set of images that show a hound's-tooth fabric pattern. The search engine can perform this task by matching the text-based description against text-based metadata associated with a plurality of images. The computing environment 102 can then automatically choose a top-ranked image retrieved by this search, or generate an average of a set of top-ranked images retrieved by this search (after converting them into latent variable vectors). In this manner of operation, the computing environment 102 need not show the user the images that exhibit the desired fabric pattern. The user can judge whether this fabric pattern is satisfactory by observing its contribution to a generated image $I_G$ (described below).

A first information extraction component 104 extracts a first information item from a first input image $I_1$. An optional second information extraction component 106 extracts a second information item from a second input image $I_2$. The computing environment 102 can incorporate any number of these information extraction components that operate on respective input images to generate respective information items. In one implementation described below, the information extraction components (104, 106) correspond to encoders, and the information items correspond to latent variable vectors produced by the encoders. The latent variable vectors represent characteristics of the input images within a low-dimension semantic vector space.

In some implementations, the computing environment 102 can also optionally receive one or more text-based information items from the user that specify one or more desired image characteristics. For instance, a received text-based information item may textually specify a desired color or pattern to be used in the query image. The computing environment 102 can then process the text-based information item(s) along with the image-based information item(s). This goes beyond using text to identify input images; here, the computing environment 102 forms a generated image $I_G$ based on both image information and text information.

An image generator component 108 produces a generated image $I_G$ based on the information items fed to it. In one implementation described below, the image generator component 108 uses a machine-trained decoder neural network to generate the image $I_G$. That decoder neural network operates based on a generative model.

The computing environment 102 next uses a retrieval component 110 to submit the generated query image to a search engine 112. For example, the retrieval component 110 may use a browser application that submits the query image to an Internet-accessible search engine 112. The search engine 112 performs a search and retrieval operation based on index information stored in an index, which, in turn, is provided in data store 114. A crawler tool (not shown) creates the index information by periodically investigating the image resources provided in a distributed database. The distributed database may correspond to the distributed resources provided by the Internet.

The search engine 112 identifies zero, one or more candidate images ($I_{C1}$, $I_{C2}$, ... ) that match the query image. For example, the search engine 11 can compute a set of features for the query image, to produce a query feature set. The search engine 112 can then find one or more candidate images that have respective feature sets that match the query feature set. Note that the search engine 112 can compute and store the feature sets of the candidate images as an offline task.

To be more specific, in one implementation, the search engine 112 can use a convolutional neural network (CNN) or other deep neural network (DNN) to map the query image into a query feature vector in a low dimension semantic space. It can use an approximate nearest neighbor (ANN) technique or other technique to then find those candidate feature vectors that are closest to the query feature vector in the semantic space. Those candidate vectors are associated with respective candidate images.

Upon identifying a set of candidate images, the search engine 112 can supply those images, or representations thereof, to the retrieval component 110. The retrieval component 110 can then present those matching images to the user via a user interface presentation provided by an output device. For example, the retrieval component 110 can display a set of thumbnail images associated with the matching candidate images.

In one implementation, the computing environment 102 does not display the generated image $I_G$ to the user; rather, it just displays the input image(s) ($I_1$, $I_2$, etc.) and the matching candidate images. This is a desirable option in those cases in which the generated image $I_G$ has artifacts that a user may find aesthetically unappealing. Note that the presence of artifacts or other anomalies in the generated image $I_G$ will typically not impair the ability of search engine 112 to find candidate images that visually resemble the generated image $I_G$. This is because the search engine 112 uses the salient features of the generated image $I_G$ to find matching candidate images, and these high-level semantic features are not affected by the presence of artifacts. A developer may also opt to prevent the presentation of the generated image IG based on legal considerations.

In some scenarios, the image(s) retrieved from the search engine 112 satisfy the user's search intent, upon which the user terminates his or search as it relates to that specific search intent. In other scenarios, a user may repeat the above-described search operation at least one additional time, treating one or more of the images retrieved from the search engine 112 as one or more respective new input images ($I_1$, $I_2$). In this manner of operation, the user can effectively reformulate his or her image-based query any number of times.

A user interface (UI) component 116 allows the user to interact with the computing environment 102. For instance, an input item selection component 118 can provide various tools that allow a user to select or create input images and other input items. For example, the input item selection component 118 can allow the user to choose an image by clicking on it within a larger collection of images, or by clicking on it in a source document of any type (such as a web page). Alternatively, or in addition, the item selection component 118 can allow the user to specify a name associated with a desired input image in a text input field, such as by inputting the words "brown," "hound's-tooth," etc. Alternatively, or in addition, the item selection component 118 can allow the user to specify a code associated with a desired image attribute (color, pattern, etc.) in a text input field. Alternatively, or in addition, the item selection component 118 can allow the user to specify a characteristic associated with a desired input image by selecting a desired point within a range of points (e.g., by selecting a desired color within a spectrum of colors), or by manipulating a graphical control that governs the appearance of a pattern (e.g., by changing the width of stripes, etc.). The item selection component 118 can use yet other mechanisms for selecting input images and/or image characteristics. An input item weighting component 120 allows the user to specify weighting values that affect the combination of input items. The explanation below provides examples of graphical mechanisms that the input item weighting component 120 can use to perform this task. The UI component 116 also provides functionality that enables the retrieval component 110 to display (or otherwise convey) the search results provided by the search engine 112. Note that, while FIG. 1 shows the UI component 116 as a single monolithic component, the computing environment 102 can distribute the functionality associated with this component over one or more elements of the computing environment 102.

FIG. 2 shows a computing equipment 202 that can be used to implement the computing environment 102 of FIG. 1. The computing equipment 202 includes one or more servers 204 coupled to one or more user computing devices 206 via a computer network 208. The user computing devices 206 can correspond to any of: desktop computing devices, laptop computing devices, handheld computing devices of any types (smartphones, tablet-type computing devices, etc.), mixed reality devices, game consoles, wearable computing devices, intelligent Internet-of-Thing (IoT) devices, and so on. Each user computing device (such as representative user computing device 210) includes local program functionality (such as representative local program functionality 212). The computer network 208 may correspond to a wide area network (e.g., the Internet), a local area network, one or more point-to-point links, etc., or any combination thereof.

The functionality of the computing environment 102 of FIG. 1 can be distributed between the servers 204 and the user computing devices 206 in any manner. In one implementation, the servers 204 implement all functions of the computing environment 102 of FIG. 1. Here, the user uses a browser application provided by a user computing device to access these functions. In another implementation, each user computing device implements all of the functions of the computing environment 102 of FIG. 1. In another implementation, the servers 204 implement some functions of the computing environment, while each user computing device implements other functions. For example, the servers 204 can implement the search engine 112, while each local user computing device can implement the remainder of the computing environment 102.

As a preface to the following explanation, note that this Detailed Description explains various implementations of the computing environment 102 in the context of a search that a user conducts for apparel items. But the computing environment 102 can be applied to any subject matter, such as furniture items, home decor items, fashion accessories, interior design selections, clip art items, etc.

Figure 3:
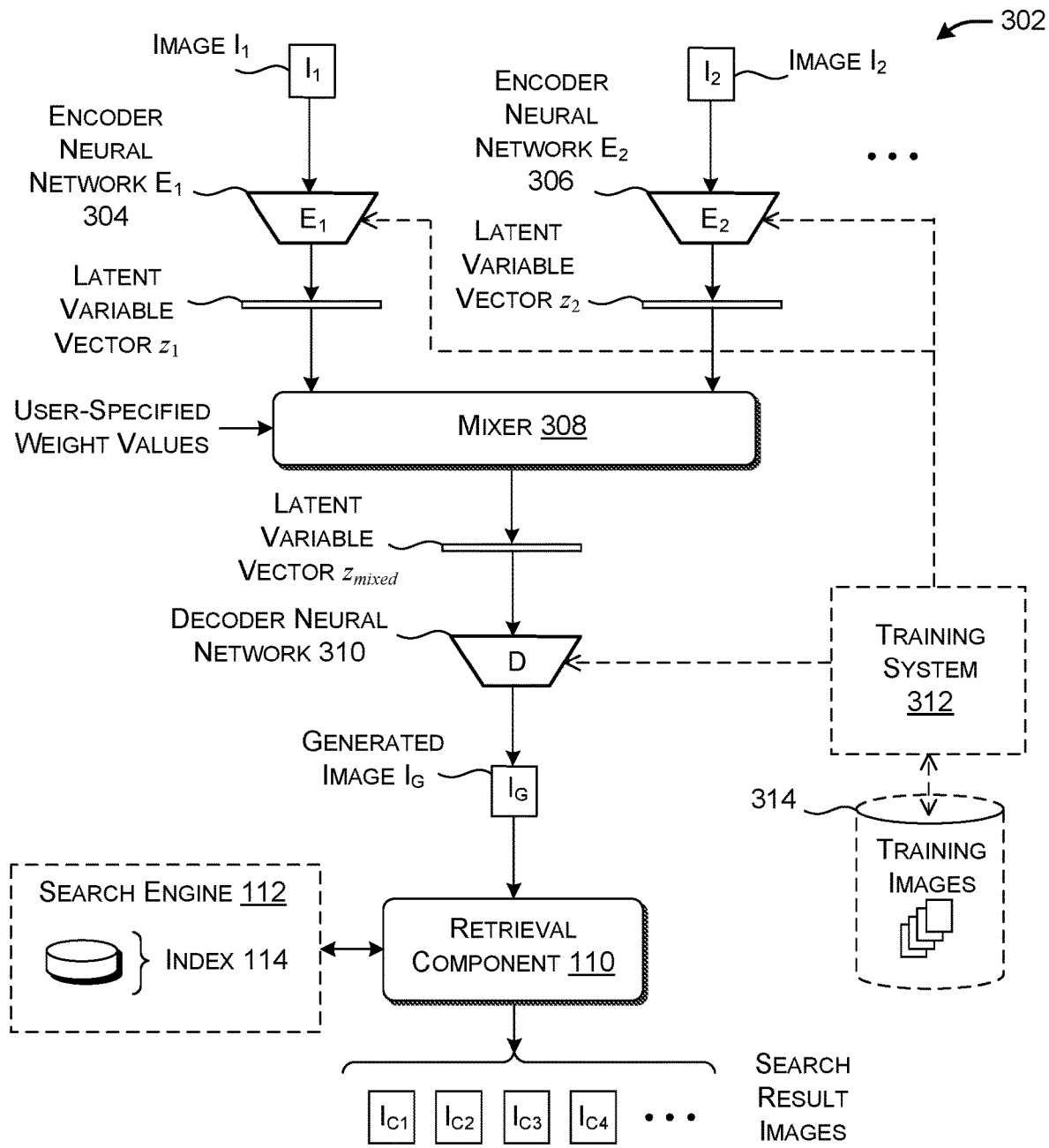
FIG. 3 shows one implementation of the computing environment of FIG. 1, referred to herein as a machine-learned (ML) computing environment.

FIG. 3 shows one implementation of the computing environment 102 for producing an image-based query, referred to as a machine-learned (ML) computing environment 302. The ML computing environment 302 formulates the image-based query based on two or more input images (e.g., $I_1$, $I_2$, etc.). A user can provide each image using any technique set forth above, e.g., by capturing the image using a camera, selecting the image within a corpus or document, performing a text-based search for the image, and so on.

A first encoder 304 ("first encoder" for brevity) maps the first image Ii into a first latent variable vector $z_1$, while a second encoder 306 ("second encoder" for brevity) maps the second image $I_2$ into a second latent variable vector $z_2$. In one implementation, the first encoder 304 and the second encoder 306 correspond to neural networks constructed based on the same machine-trained model. For instance, the first encoder 304 and the second encoder 306 may represent two instantiations of the same neural network computer code. The first encoder 304 and the second encoder 306 can operate in parallel or in series. In another implementation, the encoders (304, 306) are implemented by technology other than neural networks, as will be described below in connection with FIG. 10.

In one implementation, the neural network provided by each encoder (if used) may correspond to some variant of a convolutional neural network (CNN), described in greater detail in connection with FIG. 12. The CNN maps each input image into a latent variable vector in a low-dimension semantic space. The latent variable vector provides a distributed representation of content conveyed by the input image.

A mixer 308 combines the first latent variable vector $z_1$ and the second latent variable vector $z_2$, to produce a mixed latent variable vector $Z_{mixed}$. For example, the mixer 308 can add the first latent variable vector $z_1$ to the second latent variable vector $z_2$, subtract the first latent variable vector $z_1$ from the second latent variable vector $z_2$ (or vice versa), average plural latent variable vectors, etc. Two latent variable vectors are combined together by combining their respective elements in respective dimensions. That is, if $z_1$ has elements $[a_1, a_2, a_3, \ldots, a_n]$, and $z_2$ has elements $[b_1, b_2, b_3, \ldots, b_n]$, then the combination of these two vectors produces a mixed vector with elements $[a_1+b_1, a_2+b_2, a_3+b_3, \ldots, a_n+k]$. Combination of two latent variable vectors is appropriate when the user wants to produce a synthesized image in which the features of one image modify the features of another image. Averaging of latent variable vectors is appropriate when the user wants to produce a generated image that represents a generalized depiction of an object-of-interest.

In some implementations, the mixer 308 also applies one or more weighting values in combining the latent variable vectors ($z_1$, $z_2$). For example, assume that the user specifies a weighting value $w_1$ for the first input image and a value $w_2$ for the second input image. The mixer 308 can then compute the sum: $w_1 z_1 + w_2 z_2$. Alternatively, or in addition, the user can specify weighting values that affect individual dimensions of the latent variable vectors. Alternatively, or in addition, the mixer 308 can apply fixed weighting values selected by a developer, rather than the end user. Alternatively, or in addition, the mixer 308 can apply weighting values produced by an offline machine-training component (not shown).

A decoder neural network 310 ("decoder" for brevity) maps the mixed latent variable vector $z_{mixed}$ into a generated image $I_G$, which serves as the query image. The decoder 310 produces the generated image IG based on a machine-trained generative model. The generative model produces a synthetic image $I_G$ that generally has no preexisting "real" counterpart image. The generative model is nevertheless trained based on a corpus of real images, and therefore, in the process of generating the image $I_G$, relies on insight drawn from those real images. The retrieval component 110 then conducts a search based on the query image in the same manner described above.

A training system 312 generates the machine-trained models used by the ML computing environment 302 in an offline training process. It performs this task based on a corpus of real images provided in a data store 314. Additional information regarding the operation of the training system 312 is provided below in connection with the description of FIGS. 9, 13 and 14.

Figure 4:
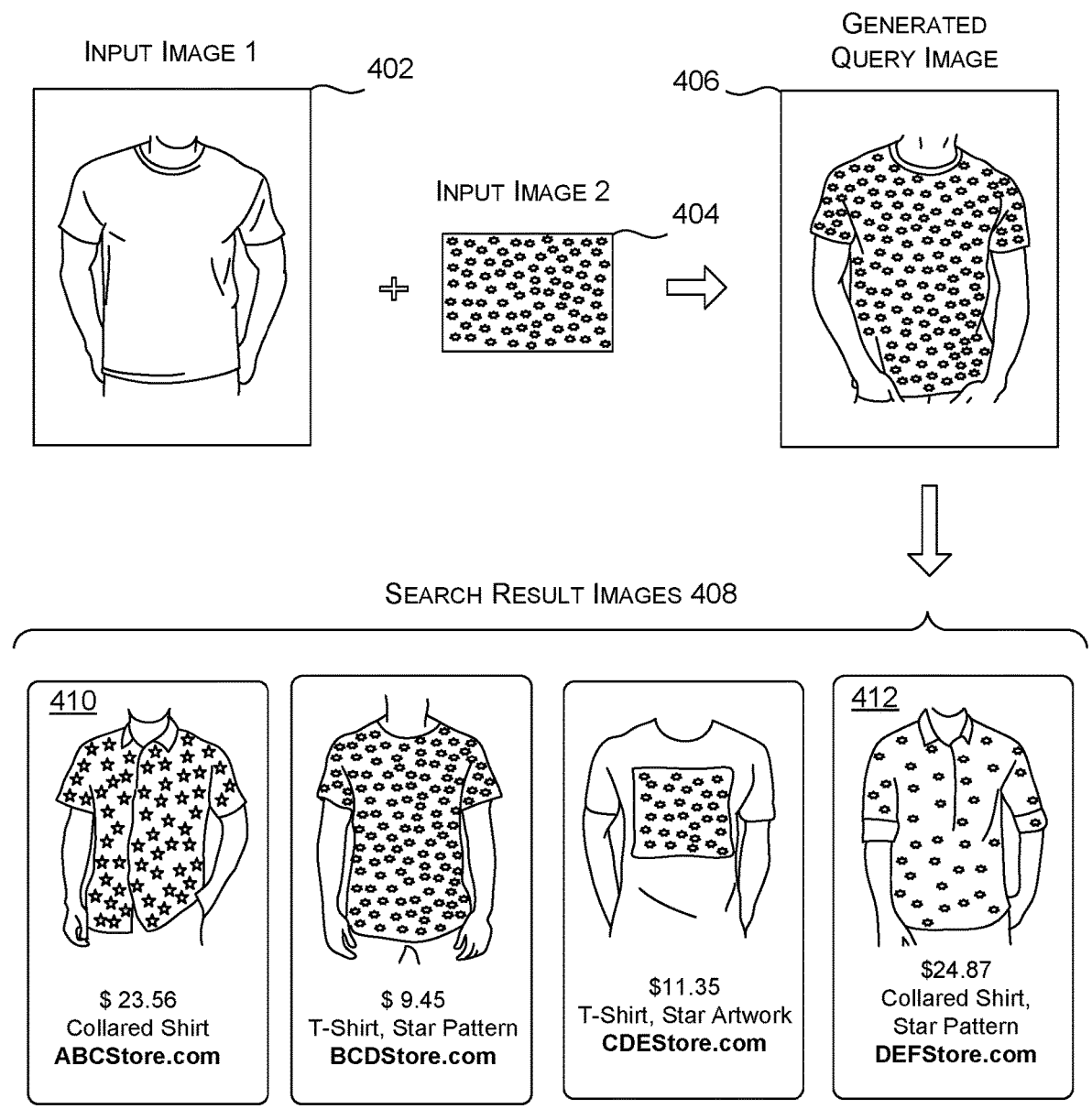
FIG. 4 shows an example of the operation of the implementation of FIG. 3.

FIG. 4 shows an example of the operation of the ML computing environment 302 of FIG. 1. In this scenario, the user selects a first input image 402 that shows a short-sleeve T-shirt in any manner specified above. The user selects a second input image 404 that shows a fabric pattern having a blue star pattern. For instance, the user may interact with the input item selection component 118 to select the second input image 404 from a larger collection of images, or from a web page that shows this image 404. Or the user can enter a description of a desired pattern into a text field of the input item selection component 118, e.g., by typing "blue stars." The ML computing environment 302 can consult a lookup table to map this phrase to a stock image showing a star pattern. Or the ML computing environment 302 can conduct a text-based search based on this key phrase to retrieve one or more images that show fabrics having a star pattern. In these cases, the ML computing environment 302 need not show the user the actual second input image(s) that it retrieves. The ML computing environment 302 can choose the top-ranking image that it identifies, or it can choose a set of the top-ranking images.

The ML computing environment 302 uses the first encoder 304 to convert the first input image 402 into a first latent variable vector $z_1$, and uses the second encoder 306 to convert the second input image 404 into a second latent variable vector $z_2$. The ML computing environment 302 adds the first latent variable vector $z_1$ and the second latent variable vector $z_2$ to produce a mixed latent variable vector $Z_{mixed}$. The ML computing environment 302 then uses the decoder 310 to convert the mixed latent variable vector $z_{mixed}$ into a generated image 406. Note that the generated image 406 shows an apparel item and style that resemble the first input image 402, with a pattern that resembles the second input image 404. The generated image 406 is a computer-synthesized image that need not have any direct relation to a single preexisting real image.

In other cases (not shown), the second input image 404 may correspond to another item of apparel. For example, the second input image 404 can show a collar style. In another case, the ML computing environment 302 can accept three or more input items of any kind(s).

The ML computing environment 302 submits the generated image 406 to the search engine 112 as a query image. The search engine 112 returns a set of candidate images 408 that it determines match the query image with an environment-specific degree of confidence. For example, the search engine 112 can return thumbnail representations of the matching images. The search engine 112 can also provide text information that describes a product shown by each image. The search engine 112 can also provide a link that allows a user to access further information regarding a product shown in an image, and optionally purchase the product. Each matching image corresponds to a real preexisting image stored in a data store.

Note that the matching candidate images 408 visually resemble the query image 406. But each matching image may also vary from the query image in one or more respects. For example, a first matching image 410 shows a pattern of stars, in which the shape of each star differs somewhat from the star shape shown in the second input image 404. The first matching image 410 also includes a collar, whereas the first input image 402 omits a collar. The fourth matching image 412 includes the same-shaped stars as the second input image 404, but includes a lower density of stars than the second input image 404. It also includes a collar.

Figure 5:
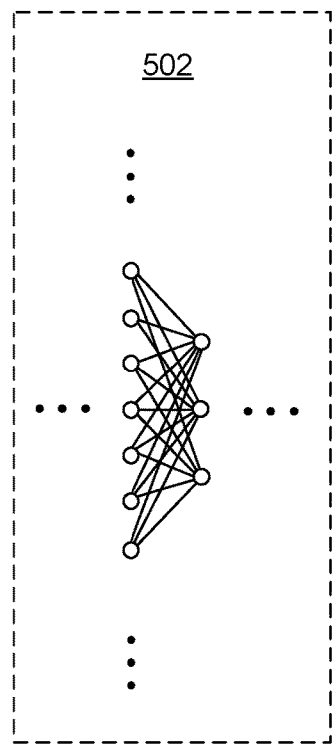
FIG. 5 shows a portion of a neural network. The implementation of FIG. 3 can include one or more neural networks.

Advancing to FIG. 5, the ML computing environment 302 can include one or more neural networks. FIG. 5 shows a portion of two layers of a feed-forward neural network 502. In the fully-connected case, each neuron in a layer j of the neural network is connected to each neuron in the preceding layer j−1. More specifically, in a fully-connected case, the layer j produces output values $z_j$ given by the formula $z_j=f(W_j z_{j-1}+b_j)$, for j=2, . . . N. The symbol $W_j$ denotes a machine-learned weighting matrix for the layer j, and the symbol $b_j$ refers to a machine-learned bias vector for the layer j. The activation function f(·) can be formulated in different ways, such as the tanh function or the sigmoid function or the rectified linear unit (ReLU) function.

Figure 6:
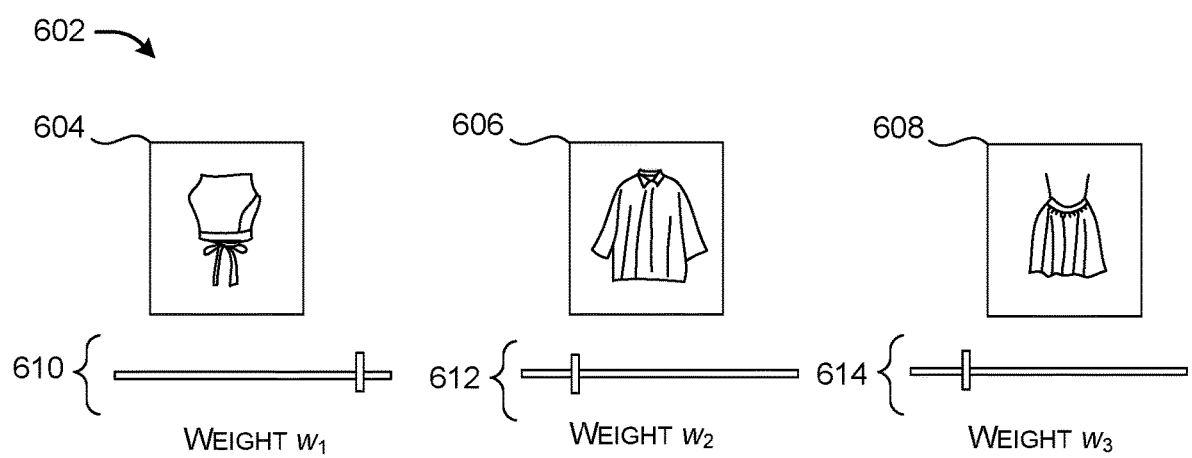
FIG. 6 shows a first graphical control for producing weighting values for application in the implementation of FIG. 3.
Figure 7:
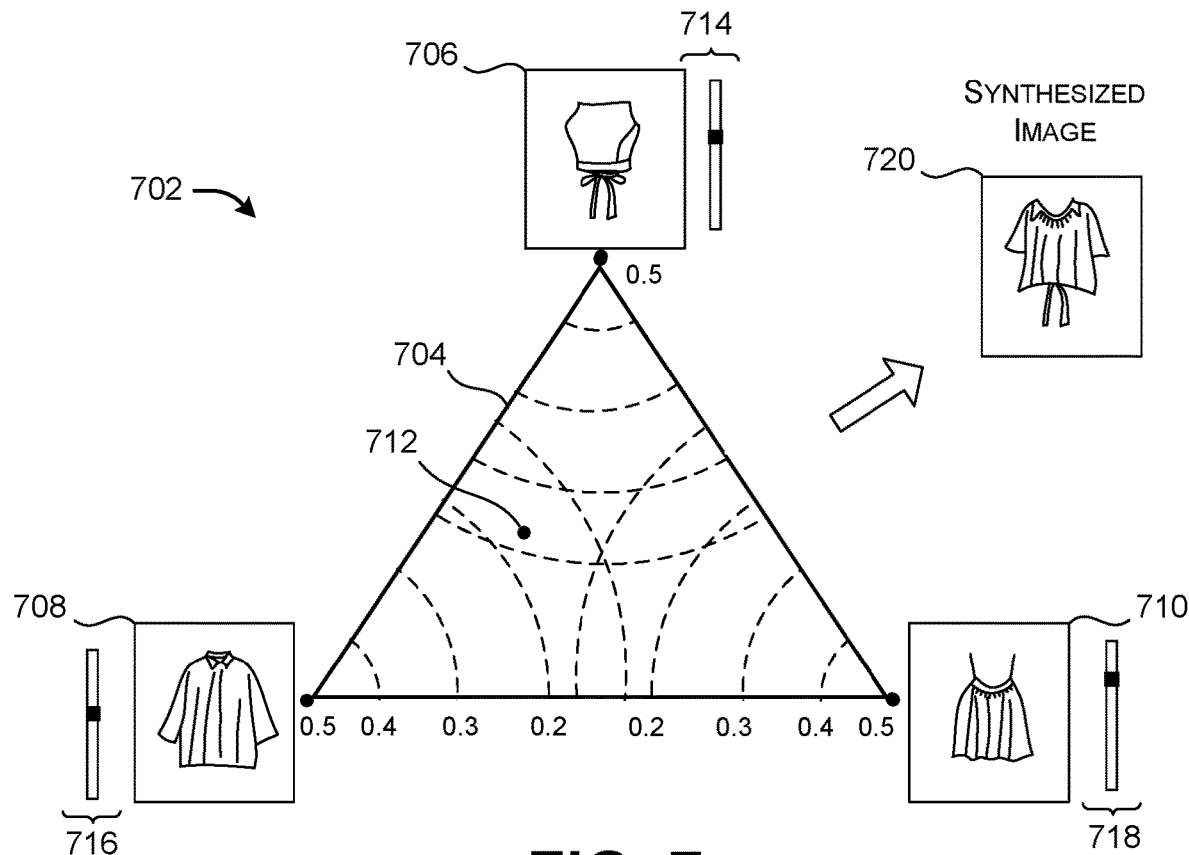
FIG. 7 shows a second graphical control for producing weighting values.

FIGS. 6 and 7 show two respective graphical controls that allow a user to choose weighting values. The ML computing environment 302 applies the weighting values to modify the latent variable vectors provided by the encoders (306, 308). The mixer 308 performs this modification operation by multiplying each latent variable vector by its associated weighting value.

Beginning with FIG. 6, a first graphical control 602 includes three input images (604, 606, 608) selected by the user. It also includes three respective slider bars (610, 612, 614) associated with the respective input images (604, 606, 608). A user can choose a weighting value to be applied to an input image by interacting with a slider bar associated with the input image. The mixer 308 responds to the user's weight selection for this input image by modifying the appropriate latent variable vector by the chosen weighting value.

For instance, each slider bar can allow a user to choose a weighing value between 0.0 and 1.0 by moving a slider element from a left end (0.0) to a right end (1.0). In the scenario show in FIG. 6, the user chooses a relatively high weighting value to be applied to the latent variable vector associated with the first input image 604, to convey that she wishes the query image to strongly resemble the style shown in the first input image 604. The user chooses comparatively lower weighting values to be applied to the latent variable vectors associated with the second and third input images (606, 608); this is because the user places a lower priority on the features conveyed by the second and third input images (606, 608).

The use of a slider bar shown in FIG. 5 is merely illustrative. In other cases, a user can specify a per-image weighting value by manipulating a scroll wheel, by rotating a graphical knob, by selecting a numerical value in an input field of a user interface presentation, by making a voice command, etc.

FIG. 7 shows a second graphical control 702 that includes a cursor navigation space 704 having a triangular shape. Each vertex of the navigation space 704 is associated with a particular input image. To convey this association, the second graphical control 702 displays thumbnail images (706, 708, 710) at the respective vertices of the navigation space 704.

In operation, the user interacts with any kind of input device to choose a position of a cursor 712 within the navigation space 704 (where a "cursor" corresponds to an indicator having any visual properties that marks a position). In response, the ML computing environment 302 determines a weighting value to be applied to each latent variable vector (associated with a corresponding input image) that is based on a distance between the cursor 712 and a vertex of the navigation space 704 that is associated with the input image. For example, in the example of FIG. 7, the cursor 712 is located a distance $d_1$ from a first input thumbnail image 706, a distance $d_2$ from a second thumbnail image 708, and a distance $d_3$ from a third thumbnail image 710. In response to this position of the cursor 712, the mixer 308 modifies the latent variable vector of the first input image by a weighting value that is based on $d_1$, the latent variable vector of the second input image by a weighting value that is based on $d_2$, and the latent variable vector of the input third image by a weighting value that is based on $d_3$.

More specifically, in one non-limiting implementation, each reference point corresponds to the apex of a Gaussian probability density function (PDF) of weighting values. The weighting values of each Gaussian distribution taper off from its apex in proportion to the distance from the apex. At the current position of the cursor 712, the ML computing environment 302 finds a first component weighting value $\lambda_1$ based on a Gaussian distribution emanating from the vertex associated with the first input image, a second component weighting value $\lambda_2$ with respect to a Gaussian distribution emanating from the vertex associated with the second input image, and a third component weighting value $\lambda_3$ with respect to a Gaussian distribution emanating from the vertex associated with the third input image. It then computes a normalized weighting value w for each input each image. For example, the ML computing environment 302 can compute a final weighting value $w_1$ for the first input image as $\lambda_1/(\lambda_1+\lambda_2+\lambda_3)$. The second graphical control 702 can optionally also show weighting indicators (714, 716, 718) associated with the three thumbnail images (706, 708, 710). Each weighting indicator provides a graphical representation of a weighting value associated with a respective image, ranging from 0.0 to 1.0. These indicators (714, 716, 718) change as the user moves the cursor 712 in the navigation space 704.

Further, the second graphical control 702 can show a representation of a generated image 720, corresponding to a synthesis of the three input images produced in real time by the ML computing environment 302. The representation of the generated image 720 changes as the user moves the cursor 712 in the navigation space 704. For instance, by moving the cursor 712 closer to one of the thumbnail images, the generated image 720 will exhibit greater resemblance to that thumbnail image.

The second graphical control 702 can adopt a navigation space having any other shape (other than triangular), and can accommodate any number of input images. For example, the second control graphical control 702 can show a square-shaped navigation space for the case of four input images, a pentagon-shaped navigation space for the case of five input images, etc.

Figure 8:
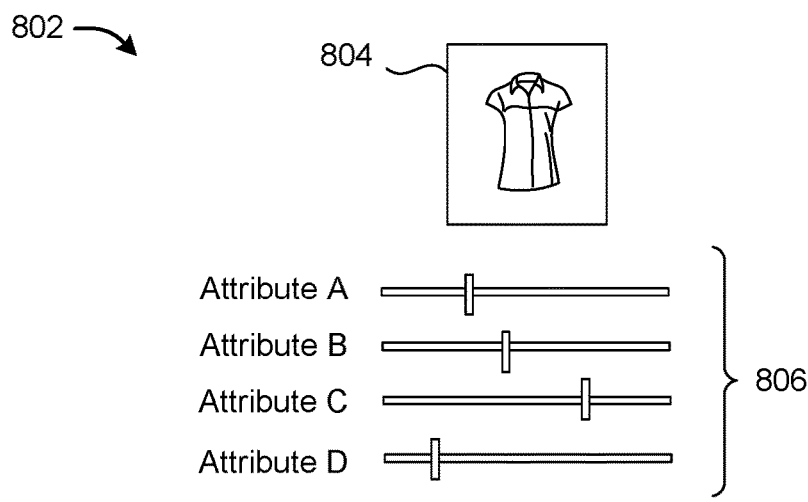
FIG. 8 shows a graphical control for modifying different attributes of a generated image.

FIG. 8 shows a graphical control 802 that allows a user to modify individual aspects of a generated image 804. More specifically, the graphical control 802 includes a set of slider bars 806 associated with the generated image 804. Each slider bar, in turn, is associated with a different aspect of the generated image 804. For example, a first slider bar may be associated with a sleeve length, a second slider bar may be associated with fabric color, a third slider bar may be associated with a density of a fabric pattern, etc. The user can choose a level associated with each identified characteristic by adjusting a slider element of a corresponding slider bar. For instance, to modify the length of a sleeve, the user can move a slider element of a slider bar associated with sleeve length.

The mixer 308 responds to a user's manipulation of a slider bar by making appropriate changes to the values of the mixed latent variable vector. For example, assume that the user manipulates a slider bar associated with sleeve length. The mixer 308 responds to this command by modifying a vector component of the mixed latent variable vector that is associated with sleeve length. An offline process can establish the nexus between image attributes (such as sleeve length) and associated vector components of the mixed latent variable vector. For instance, the offline process can involve methodically making changes to the values of the mixed latent variable vector and observing the aspects of the generated image $I_G$ that change in response thereto. The offline process can optionally then use latent Dirichlet allocation (LDA) to identify the vector components associated with different image characteristics.

The three graphical controls described herein are set forth in the spirit of illustration, not limitation; other implementations can adopt other kinds of graphical controls that a user can manipulate to select weighting values. Alternatively, or in addition, the ML computing environment 302 can apply fixed weighting values. A developer can choose these weighting values based on offline ad hoc experimentation. Alternatively, or in addition, the ML computing environment 302 can apply weighting values produced by an offline machine-trained component (not shown). The machine-trained component can select these weighting values to achieve optimal results for different input scenarios. For example, the machine-trained component can select a weighting value to be applied to a pattern image for the input scenario in which a user seeks to combine an image of an apparel item with a pattern image. FIG. 4 shows an example of this input scenario. A training system can generate the machine-trained model based on a corpus of training examples; each such training example includes a set of weighting values, a generated image produced using these weighting values, and a score that indicates whether this set produced a desirable or undesirable result, as judged by a human observer or some proxy thereof.

Alternatively, or in addition, the ML computing environment 302 can provide a semi-automated experimentation platform that assists the developer or user in choosing weighting values for a particular input scenario. (An input scenario is defined by the particular kinds of input images that the user seeks to combine, and the desired objectives of the user in combining the images.) The experimentation platform can include the type of weighting indicators (714, 716, 718) of FIG. 7 that show the weighting values applied to a set of input images at a current point in time. It can also include a representation of a generated image 720 produced using the current selection of weighting values. The experimentation platform iteratively explores a search space defined by the possible ranges of the weighting values, while simultaneously showing the effect that each change in the weighting values has on the generated image 720. When the user sees a generated image 720 that has desired characteristics, he can activate a graphical control (not shown) that causes the experimentation platform to store the set of weighting values that produces that desired result. When, on a future occasion, the user seeks to combine images in a similar input scenario, he or she can retrieve the stored set of weighting values and apply them to the input images.

Figure 9:
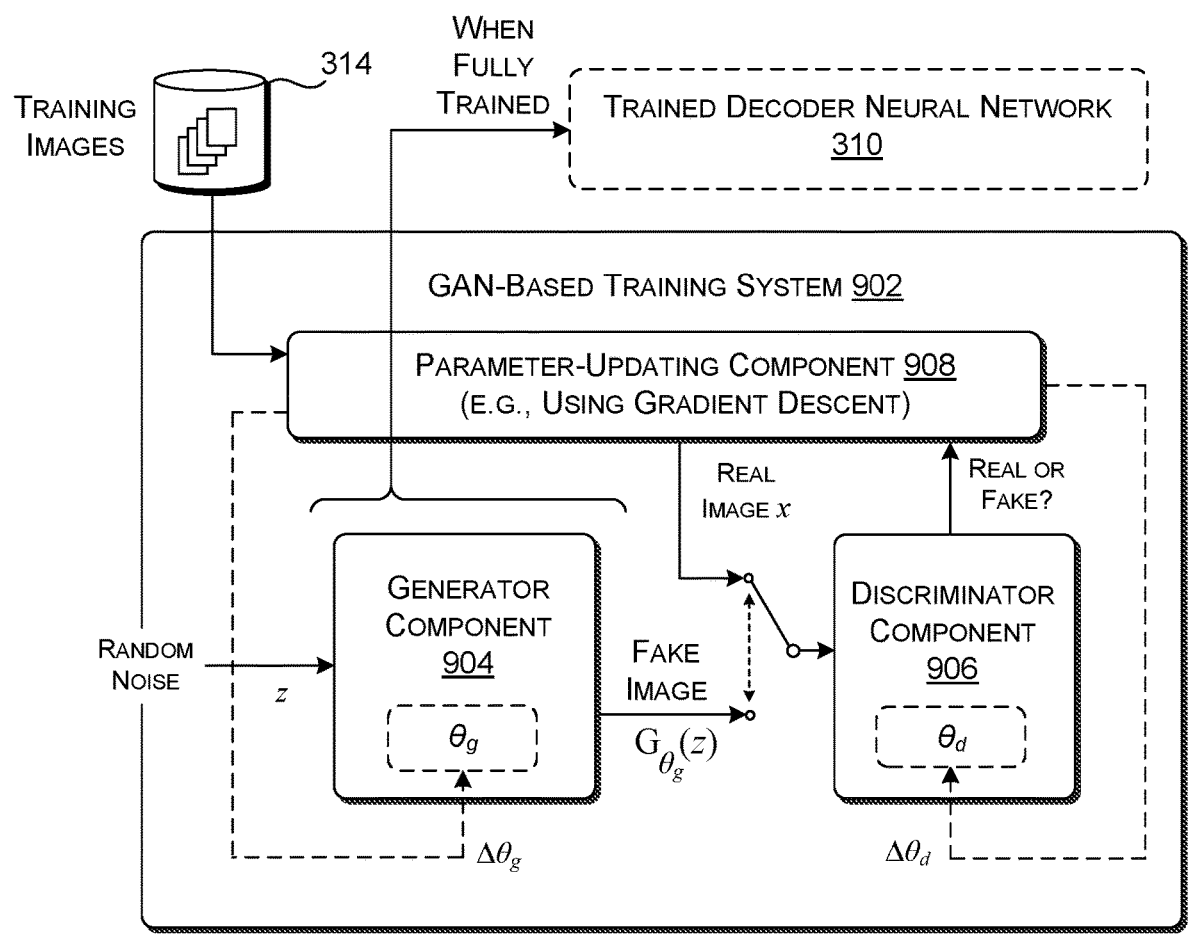
FIG. 9 shows a training system that uses a generative adversarial network (GAN) for producing a decoder neural network for use in the implementation of FIG. 3.

FIG. 9 shows a training system 902 that uses a generative adversarial network (GAN) for producing the decoder 310 as part of a preliminary offline training process. The GAN includes two principal components: a generator component 904 and a discriminator component 906. The generator component 904 corresponds to a neural network (such as a CNN) defined by a set of parameter values $\theta_g$. The discriminator component 906 also corresponds to a neural network (such as a CNN) defined by a set of parameter values $\theta_d$. In operation, the generator component 904 accepts an input vector z that represents random noise, e.g., as selected from a Gaussian distribution. The generator component 904 maps the input vector z into a synthetic or "fake" image $G_{\theta_g}(z)$, also denoted by $\hat{x}$ for brevity. At any particular instance, the discriminator component 906 receives either a real image selected from the data store 314 of real images, or a "fake" image $\hat{x}$ produced by the generator component 904. (The image $\hat{x}$ is "fake" in the sense that it is synthesized, rather than selected from a data store of real preexisting images.) The discriminator component 906 produces a classification result that indicates whether the input image is real (associated with classification result of 1) or fake (associated with a classification result of 0).

A parameter-updating component 908 iteratively adjusts the parameter values of the generator component 904 and the discriminator component 906 based on the classification results of the discriminator component 906. More specifically, the parameter-updating component 908 adjusts the parameter values of the discriminator component 906 to increase its ability to distinguish between real and fake images. The parameter-updating component 908 adjusts the parameter values of the generator component 904 such that its produces images that more readily "fool" the discriminator component 906, that is, by causing the discriminator component 906 to classify a fake image generated by the generator component 904 as real. In this manner of operation, the training component 902 pits the generator component 904 and the discriminator component 906 against each other, which is the reason why this type of arrangement is referred to as adversarial.

More formally stated, the parameter-updating component 908 performs training based on an objective function defined by:

$$\min_{\theta_g}\max_{\theta_d}[\mathbb{E}_{x \sim p_{data}}\log D_{\theta_d}(x) + \mathbb{E}_{z \sim p(z)}\log(1 - D_{\theta_d}(G_{\theta_g}(z)))].$$

This first part of the objective function (prior to the addition sign) depends on the output of discriminator component 906 when acting on a real image x. The notation $x \sim P_{data}$ means that the input image x is take from a distribution of real images ($p_{data}$). The second part of the object function (after the addition sign) depends on the output of the discriminator component 906 when acting on a generated (fake) image $\hat{x}$. The objective function as a whole defines a minimax optimization objective in which, with respect to the discriminator, the parameter-updating component 1008 attempts to maximize those occasions when the discriminator component outputs 1 for real images and 0 for fake images. With respect to the generator component 1004, the parameter-updating component 1008 attempts to minimize those occasions when the discriminator 1006 outputs 1 for fake images. The parameter-updating component 908 can iteratively adjust parameter values to achieve this minimax objective using any technique, such as Stochastic Gradient Descent (or Ascent).

In another implementation (not shown), the training system 902 can use a conditional GAN to train the decoder neural network 310. In a conditional GAN, the generator component 904 conditions the fake image that it generates based on a random input vector in combination with contextual information. In the present case, the contextual information may specify (for example) a category of apparel item associated with an input image.

Figure 10:
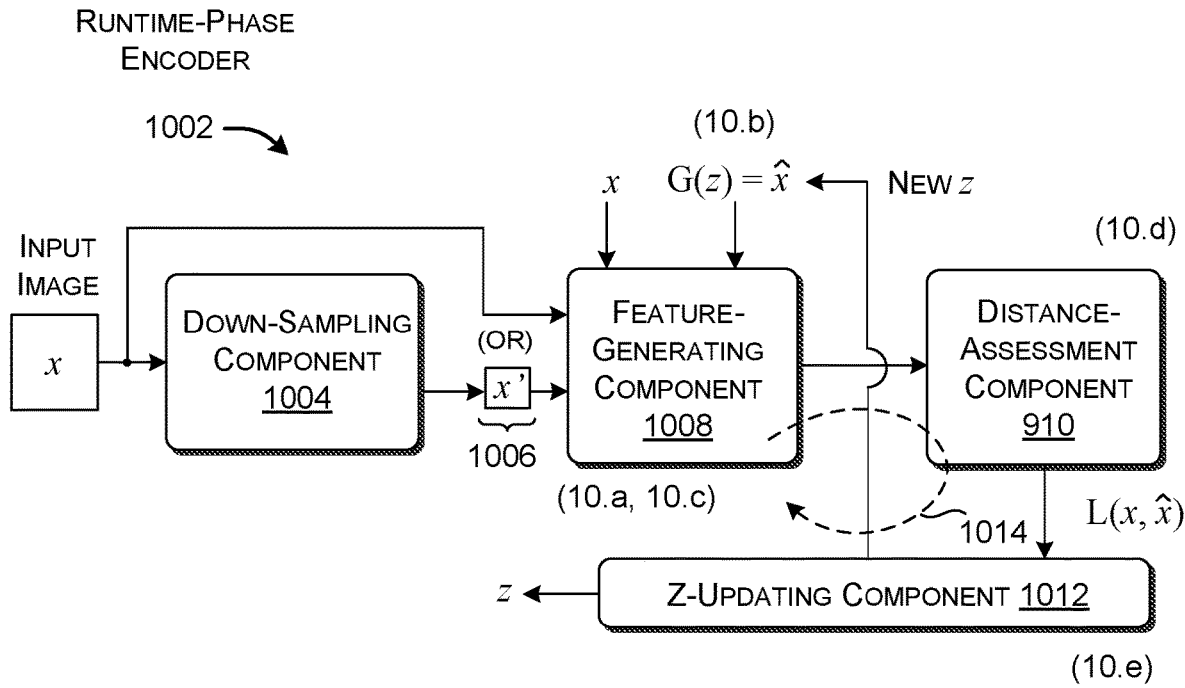
FIG. 10 shows a first version of an encoder for use in the implementation of FIG. 3.

FIG. 10 shows a first version of an encoder 1002 for use in the ML computing environment 302 of FIG. 3. By way of overview, the encoder 1002 relies on a real-time optimization procedure to generate a latent variable vector z based on a real input image x. That is, the encoder 1002 is said to operate in real time because it performs its optimization work in the application phase when the user inputs the input image x, rather than in a preliminary training phase. To reduce the latency associated with this iterative real-time operation, the encoder 1002 can optionally use a down-sampling component 1004 to reduce the size of the input image, to produce a reduced-size input image x'. For example, the down-sampling component 1004 can produce a thumbnail representation 1006 of the input image x by down-sampling the pixels in the input image x. To facilitate explanation, however, the following explanation will assume that the encoder 1002 operates on an original image x.

In operation (10.a), a feature-generating component 1008 computes a set of features associated with the input image x. For example, the feature-generating component 1008 may correspond to a CNN that maps the input image x into a feature vector $f_x$ in a low dimension semantic space. In operation (10.b), the decoder 310 (of FIG. 3) produces a generated image $\hat{x}$ in response to a candidate version of a latent variable z. For example, the decoder 310 may represent the trained model produced by the GAN-based training system 1002 of FIG. 9. In operation (10.c), the feature-generating component 1008 uses the same CNN to map the generated image $\hat{x}$ into another feature vector $f_{\hat{x}}$. In operation (10.d), a distance-assessment component 1010 determines the distance between the two feature vectors ($f_x$, $f_{\hat{x}}$) using any distance metric, such as Euclidean distance, cosine similarity, etc. In operation (10.e), a z-updating component 1012 uses any optimization technique (such as Gradient Descent) to modify the value of z so as to reduce the distance between the two feature vectors ($f_x$, $f_{\hat{x}}$) in a next computation. As represented by the loop 1014, the encoder 1002 repeats these steps (10.a to 10.e) a plurality of times until the two feature vectors are within a prescribed distance of each other. At this stage, the encoder 1002 outputs the final version of z. More formally stated, the z-selecting component 1012 performs an optimization routine given by:

$$\min_{z} \mathcal{L}(x, G(z)), \text{ where } \mathcal{L}(x, G(z)) = \|f_x - f_{\hat{x}}\|.$$

Figure 11:
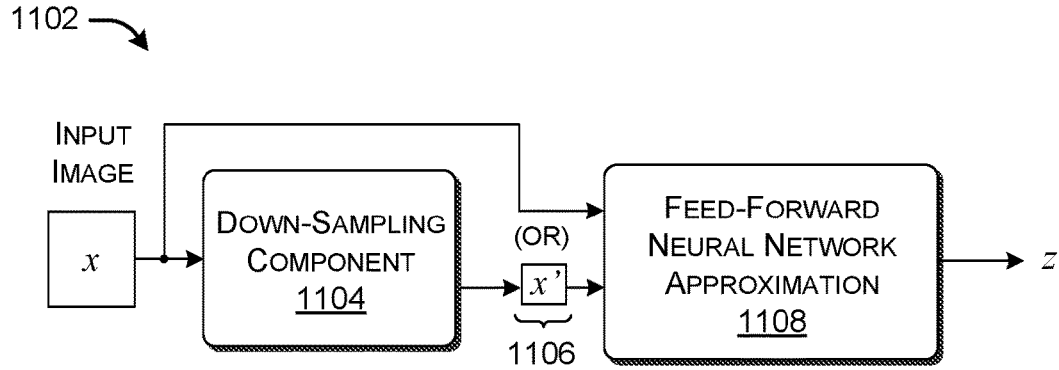
FIG. 11 shows another version of an encoder for use in the implementation of FIG. 3.

FIG. 11 shows a second version of an encoder 1102 for use in the ML computing environment 302 of FIG. 3. The encoder 1102 again optionally uses a down-sampling component 1104 to reduce the size of input image x to produce a thumbnail representation 1106. Here, however, the encoder 1102 replaces the iterative functionality described with reference to FIG. 10 with a feed-forward neural network 1108 (or other type of neural network). The feed-forward neural network 1108 uses a model trained based on a corpus of training pairs, each of that associates an input image x with an appropriate latent variable vector z for the input image. For example, the corpus can include pairs produced by the encoder 1002 of FIG. 10 in any offline data collection process. The feed-forward neural network 1108 can map the input image x to a latent variable z without any iterative calculations, and therefore can be expected to have lower latency compared to the encoder 1002 of FIG. 10.

Figure 12:
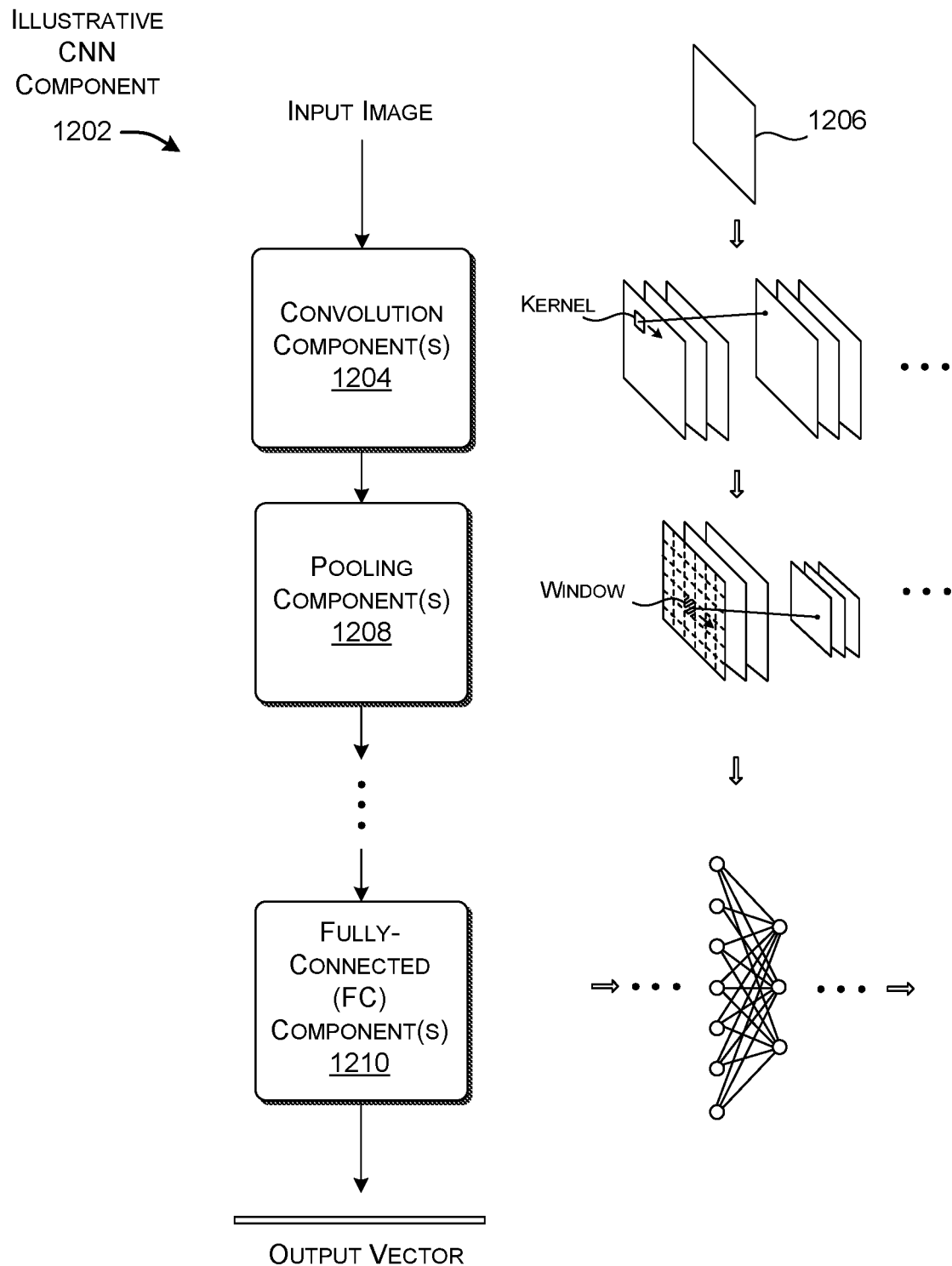
FIG. 12 shows a convolutional neural network (CNN) that can be used to implement various components of the implementation of FIG. 3.

FIG. 12 shows a convolutional neural network (CNN) 1202 that can be used to implement various components of the ML computing environment 302 of FIG. 3. For example, the kind of architecture shown in FIG. 12 can be used to implement some types of encoders, the discriminator component 906 (of FIG. 9), the feature-generating component 1008 of FIG. 10, and so on. In the context of an encoder, the CNN 1202 maps an input image into a latent variable vector z. In the context of the discriminator component 906, the CNN 1202 maps an input vector into a decision (that indicates whether the input image is considered real or fake).

In the context of the feature-generating component 1008, the CNN 1202 maps an input image into a feature vector.

The CNN 1202 performs analysis in a pipeline of stages. One of more convolution components 1204 perform a convolution operation on an input image 1206. One or more pooling components 1208 perform a down-sampling operation. One or more fully-connected components 1210 respectively provide one or more fully-connected neural networks, each including any number of layers. More specifically, the CNN 1202 can intersperse the above three kinds of components in any order. For example, the CNN 1202 can include two or more convolution components interleaved with pooling components. In some implementations (such as the case in which the CNN 1202 is used to implement the discriminator component 906), the CNN 1202 can include a final post-processing component that outputs a classification result based on a feature vector provided by a preceding layer. For example, the post-processing component can correspond to a Softmax component, a support vector machine (SVM) component, etc.

In each convolution operation, a convolution component moves an n×m kernel across an input image (where "input image" in this general context refers to whatever image is fed to the convolutional component). In one case, at each position of the kernel, the convolution component generates the dot product of the kernel values with the underlying pixel values of the image. The convolution component stores that dot product as an output value in an output image at a position corresponding to the current location of the kernel. More specifically, the convolution component can perform the above-described operation for a set of different kernels having different machine-learned kernel values. Each kernel corresponds to a different pattern. In early layers of processing, a convolutional component may apply a kernel that serves to identify relatively primitive patterns (such as edges, corners, etc.) in the image. In later layers, a convolutional component may apply a kernel that finds more complex shapes (such as shapes that resemble human legs, arms, etc.).

In each pooling operation, a pooling component moves a window of predetermined size across an input image (where the input image corresponds to whatever image is fed to the pooling component). The pooling component then performs some aggregating/summarizing operation with respect to the values of the input image enclosed by the window, such as by identifying and storing the maximum value in the window, generating and storing the average of the values in the window, etc.

A fully-connected component can begin its operation by forming a single input vector. It can perform this task by concatenating the rows or columns of the input image (or images) that are fed to it, to form a single input vector. The fully-connected component then processes the input vector using a fully-connected neural network.

The decoder 310 replaces the above-described convolution component(s) 1204 and pooling component(s) 1208 with one or more deconvolution components. A deconvolution component performs the reverse operation as the convolution component(s) 1204 and pooling component(s) 1208. For example, a deconvolution component can take a value in an input image and expand it to an n×n image region in an output image. The deconvolution component repeats this operation for each input value as it sequences through the input values in the input image. Each output value in the output value may reflect the contribution of plural input values in the input image.

Figure 13:
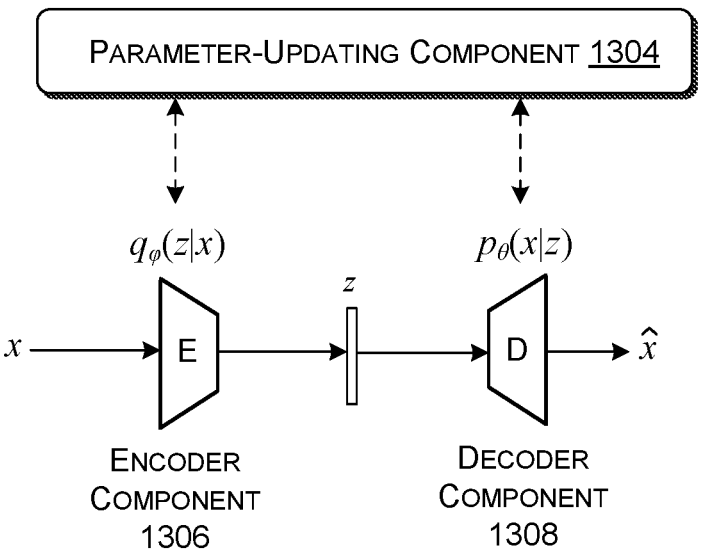
FIG. 13 shows a training system that uses a variational autoencoder (VAE) to produce an encoder and decoder for use in FIG. 3.

FIG. 13 shows another training system 1302 that uses a parameter-updating component 1304 to train an encoder component 1306 and a decoder component 1308. The encoder component 1306 maps an input vector x into a latent variable vector z, and the decoder component 1308 maps the latent variable z into a generated image x̂.

More specifically, the encoder component 1306 and decoder component 1308 together implement a variational autoencoder (VAE). In this setup, the loss function for use in training may be given by:

$$\mathcal{L}_{(\theta,\phi)} = -\mathbb{E}_{z \sim q_\phi(z|x)}[p_\theta(x|z)] + D_{KL}(q_\phi(z|x) \| p_\theta(z)).$$

The notation $p_\theta(\cdot)$ represents the function implemented by the encoder component 1306, defined by a set of parameter values θ. The notation $q_\phi(\cdot)$ represents the function performed by the decoder component 1308, defined by a set of parameter values φ. The notation $D_{KL}$ represents a Kullback-Leibler divergence measure. When the training is complete, the encoder component 1306 provides parameter values for use in the encoders (304, 306) of FIG. 3, while the decoder component 1308 provides parameter values for use in the decoder 310 of FIG. 3. Thus, unlike the GAN example of FIG. 9, the training system 1302 simultaneously trains both an encoder and decoder.

Figure 14:
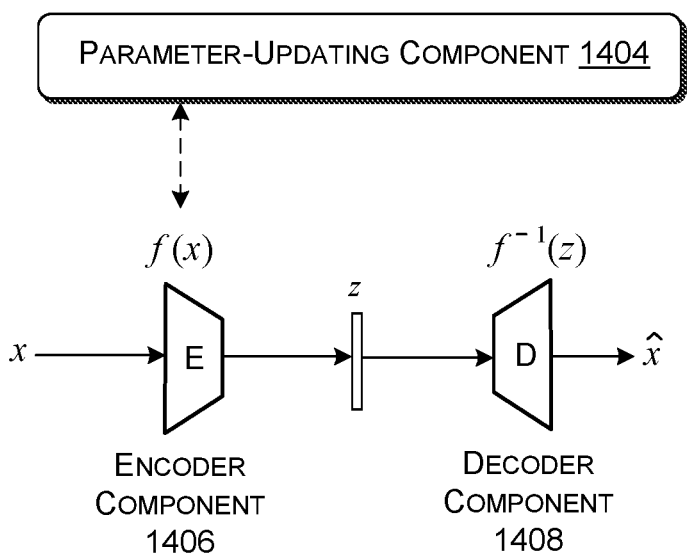
FIG. 14 shows a training system that uses a flow-based neural network system to produce the encoder and decoder of FIG. 3.

FIG. 14 shows another training system 1402 that uses a parameter-updating component 1404 to train an encoder component 1406 and a decoder component 1408. Like the case of FIG. 13, the encoder component 1406 maps an input vector x into a latent variable vector z, and the decoder component 1408 maps the latent variable z into a generated image x̂. More specifically, the encoder component 1406 and decoder component 1408 in this implementation provide a flow-based neural network system. Here, the decoder component 1408 implements a function that is the inverse of a function f(x) provided by the encoder component 1406. The loss function in this case is the negative log-likelihood computed over a set G of training images:

$$\mathcal{L}(G) = -\frac{1}{|G|} \sum_{x \in G} \log p(x).$$

Like the case of FIG. 13, the training system 1402 simultaneously produces models for use by the encoders (304, 306) and decoder 310 of FIG. 3.

Still other variations of the technology set forth above are possible. Illustration variations are explained below with reference to the computing environment 102, although these variations also apply to the more specific ML computing environment 302. For instance, in another implementation, one or more information extraction components (e.g., 104, 106) can operate on input images (e.g., $I_1$, $I_2$) as described above to produce the image-based information items (e.g., one or more image-based latent variable vectors). In addition, the computing environment 102 can receive one or more-text based information items, such as a phrase that describes a particular color or pattern (e.g., "large hound's-tooth"). The image generator component 108 can then produce the generated image $I_G$ by operating on both the image-based information item(s) and the text-based information item(s). For instance, the image generator component 108 can include a machine-trained generative model that uses the text-based information item(s) as supplemental inputs that influence the generation of $I_G$.

In another implementation, one or more text-based information extraction components (not shown) can convert one or more text-based information items into distributed representations of those information item(s). For instance, a machine-trained text-based encoder can convert input text into an n-gram representation, and then map that n-gram representation into a text-based latent variable vector. The image generator component 108 can then use a machine-trained generative model to produce a generated image $I_G$ based on the image-based variable vector(s) and the text-based variable vector(s).

In another implementation, the computing environment 102 can comingle text-based search operations and image-based search operations in a flexible manner. For example, assume that a user performs a first text-based search to find a prom dress having a desired style. For example, the user submits the text-based query "prom dress strapless" to the search engine 112. In response, the search engine 112 returns a set of images having text-based metadata that matches the user's text-based query. Assume that the user selects one of these images (such as the top-ranked image), which constitutes a first input image $I_1$.

But assume that the user is not quite happy with the dress shown in the input image $I_1$. For example, assume that the input image $I_1$ shows the dress in white, whereas the user wants to see this same style of dress in a different color, such as red. In response, the user modifies her earlier text-based query so that it now reads "prom dress strapless red." Or assume that the search engine's results detail page for the image $I_1$ includes a text input box that allows the user to specify a new attribute associated with the input image $I_1$. In that case, the user can simply enter the attribute "red" in the text box. In response to either of these input actions, the search engine 112 performs a new search based on the modified text query "prom dress strapless red." Assume that the search engine 112 returns a set of N supplemental images $(I_{21}, I_{22}, I_{23}, \ldots, I_{2N})$ having metadata that matches the revised text-based query.

The first information extraction component 104 generates a first information item based on the first input image $I_1$. One or more supplemental information extraction components generate second information items based on the retrieved supplemental images $(I_{21}, I_{22}, I_{23}, \ldots, I_{2N})$. The image generator component 108 then provides a generated image $I_G$ based on the first information item and the second information items.

More specifically, in the context of the ML computing environment 302 of FIG. 3, the first encoder 304 maps the first image $I_1$ into a first latent variable vector $z_1$. One or more supplemental encoders map the supplemental input images $(I_{21}, I_{22}, I_{23}, \ldots, I_{2N})$ into supplemental latent variable vectors $(z_{21}, z_{22}, z_{23}, \ldots, z_{2N})$. The mixer 308 can combine these latent variable vectors together in an environment-specific manner, to produce a mixed latent variable vector $Z_{mixed}$. In one implementation, for instance, the mixer 308 generates an average of the supplemental latent variable vectors, to produce an average latent variable vector. The mixer 308 then subtracts the average latent variable vector from the first latent variable vector $z_1$ to produce a difference vector. The difference vector reveals a direction in semantic vector space in which the supplemental input images differ from the first input image $I_1$. The mixer 308 can then modify the first latent variable vector $z_1$ in the identified direction by a prescribed amount. In the specific example developed above, this operation will have the effect of moving the semantic-space representation of the prom dress in the direction association with the color red.

The remainder of the process operates in the same manner described above. For example, the decoder neural network 310 maps the mixed latent variable vector $Z_{mixed}$ into a generated image IG, and the retrieval component 110 submits this generated image $I_G$ as a search query to the search engine 112. Overall, the above variation allows the user to reformulate queries in a manner that combines text-based searching and image-based searching. The user can also extend the above-described operation by using any image retrieved from the search engine 112 as a new input image.

In the above example, the user uses a second text-based query to find images that operate to modify an image retrieved by a first text-based query. But more generally, a user can use the technology described above to combine any number of images retrieved through any input mechanism(s). For example, the user can perform another text-based search based on the text-based query "stripes," to find another set of supplemental images. The mixer 308 can determine the manner in which: (a) the red-dress images diverge from the original image $I_1$, and (b) the striped-dress images diverge from the original image $I_1$. It can then modify the first latent variable vector $z_1$ such that it moves within semantic vector space in both the "red" direction and "striped" direction. In still another variation, the user can use plural images of prom dresses to generate the first latent variable vector $z_1$, rather than selecting only one of the images returned by the text-based image search.

B. Illustrative Processes

Figure 15:
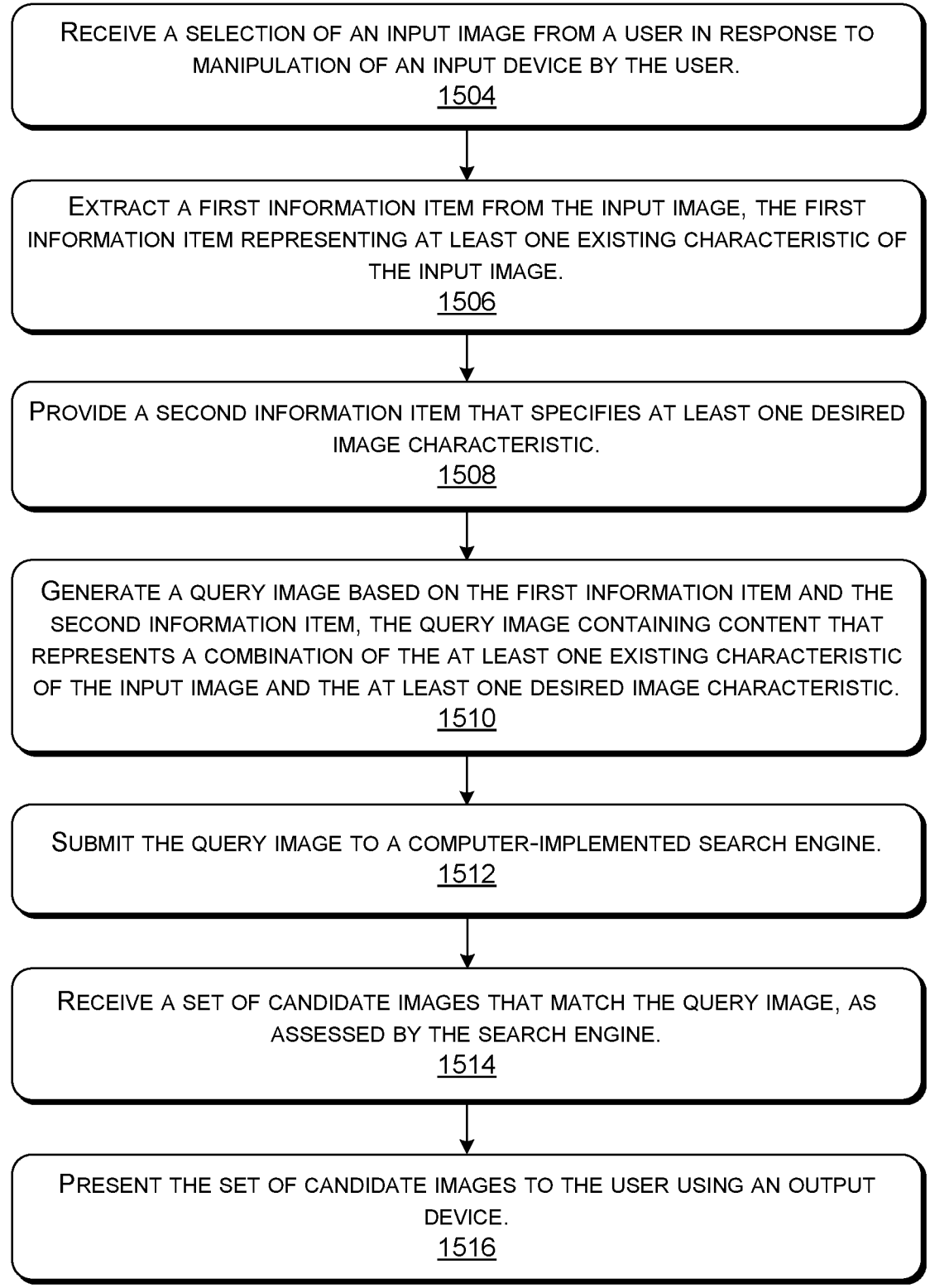
FIG. 15 shows a process that represents an overview of the operation of the computing environment of FIG. 1.
Figure 17:
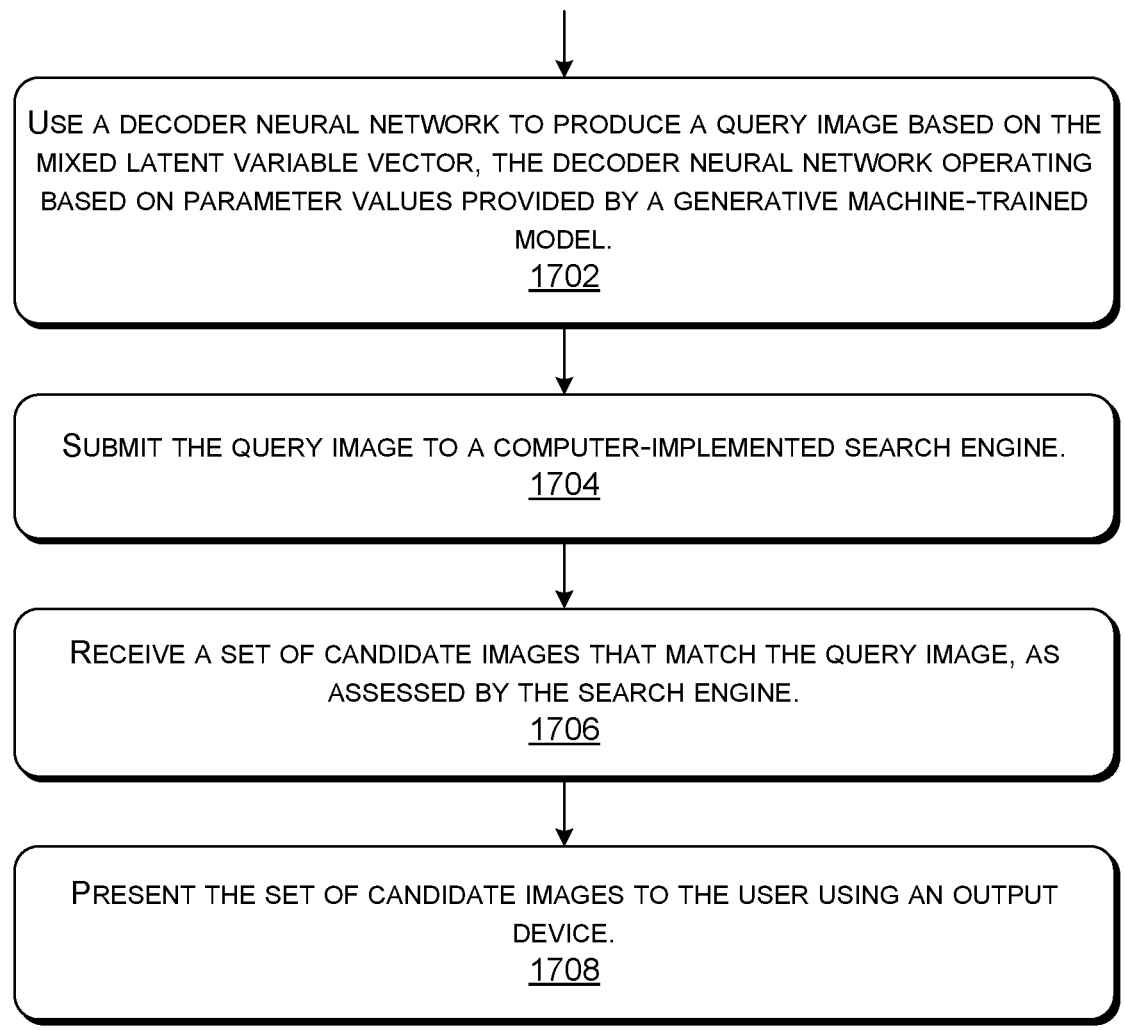

FIGS. 15-17 show processes that explain the operation of the computing environment 102 of Section A in flowchart form. Since the principles underlying the operation of the computing environment 102 have already been described in Section A, certain operations will be addressed in summary fashion in this section. As noted in the prefatory part of the Detailed Description, each flowchart is expressed as a series of operations performed in a particular order. But the order of these operations is merely representative, and can be varied in any manner.

FIG. 15 shows a process 1502 that represents an overview of the general computing environment 102 of FIG. 1. In block 1504, the computing environment 102 receives a selection of an input image from a user in response to manipulation of an input device by the user. In block 1506, the computing environment 102 extracts a first information item from the input image, the first information item representing at least one existing characteristic of the input image. In block 1508, the computing environment 102 provides a second information item that specifies at least one desired image characteristic. In block 1510, the computing environment 102 generates a query image based on the first information item and the second information item, the query image containing content that represents a combination of the at least one existing characteristic of the input image and the at least one desired image characteristic. In block 1512, the computing environment 102 submits the query image to a computer-implemented search engine 112. In block 1514, the computing environment 102 receives a set of candidate images that match the query image, as assessed by the search engine 112. In block 1516, the computing environment 102 presents the set of candidate images to the user using an output device.

FIGS. 16 and 17 together show a process 1602 that represents an overview of the ML computing environment 302 of FIG. 3. In block 1604 of FIG. 16, the ML computing environment 302 receives at least a first input image and a second input image in response to selection of the first input image and the second input image by a user. In block 1606, the ML computing environment 302 optionally receives at least one weighting value in response to a selection made the user by interacting with a graphical control provided by a user interface presentation. In block 1608, the ML computing environment 302 uses a first encoder 304 to produce a first latent variable vector based on the first input image. In block 1610, the ML computing environment 302 uses a second encoder 306 to produce a second latent variable vector based on the second input image. In one implementation, the first encoder operates based on a same machine-trained model as the second encoder 306. In block 1612, the ML computing environment 302 uses a mixer 308 to combine the first latent variable vector and at least the second latent variable vector to produce a mixed latent variable vector, this combining operation being influenced by the at least one weighting value.

Advancing to FIG. 17, in block 1702, the ML computing environment 302 uses a decoder neural network 310 to produce a query image based on the mixed latent variable vector, the decoder neural network 310 operating based on parameter values provided by a generative machine-trained model. In block 1704, the ML computing environment 302 submits the query image to a computer-implemented search engine 112. In block 1706, the ML computing environment 302 receives a set of candidate images that match the query image, assessed by the search engine 112. In block 1708, the ML computing environment 302 presents the set of candidate images to the user using an output device.

C. Representative Computing Functionality

Figure 18:
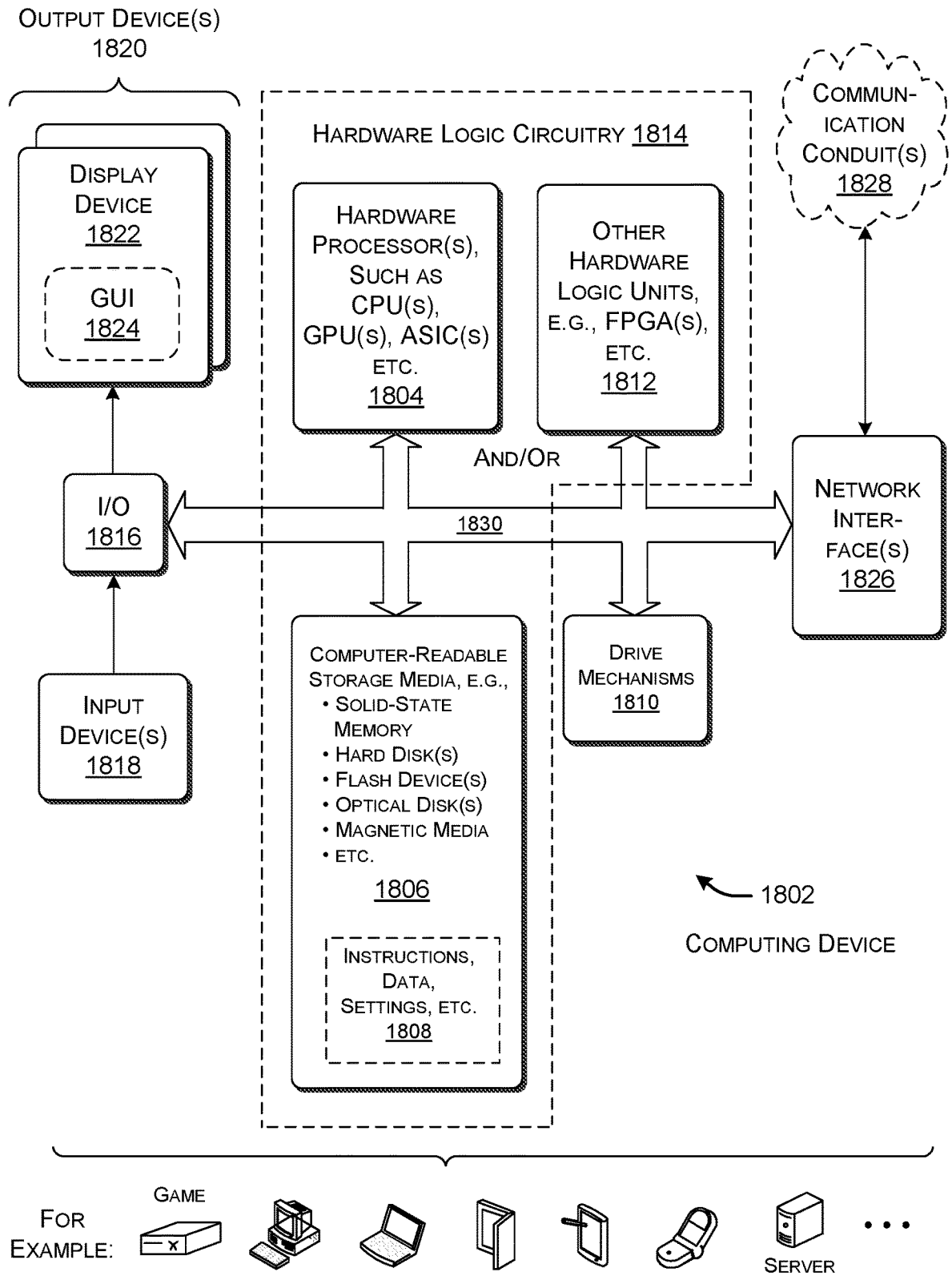
FIG. 18 shows an illustrative type of computing device that can be used to implement any aspect of the features shown in the foregoing drawings.

FIG. 18 shows a computing device 1802 that can be used to implement any aspect of the mechanisms set forth in the above-described figures. For instance, with reference to FIG. 2, the type of computing device 1802 shown in FIG. 18 can be used to implement any server or any user computing device. In all cases, the computing device 1802 represents a physical and tangible processing mechanism.

The computing device 1802 can include one or more hardware processors 1804. The hardware processor(s) can include, without limitation, one or more Central Processing Units (CPUs), and/or one or more Graphics Processing Units (GPUs), and/or one or more Application Specific Integrated Circuits (ASICs), etc. More generally, any hardware processor can correspond to a general-purpose processing unit or an application-specific processor unit.

The computing device 1802 can also include computer-readable storage media 1806, corresponding to one or more computer-readable media hardware units. The computer-readable storage media 1806 retains any kind of information 1808, such as machine-readable instructions, settings, data, etc. Without limitation, for instance, the computer-readable storage media 1806 may include one or more solid-state devices, one or more magnetic hard disks, one or more optical disks, magnetic tape, and so on. Any instance of the computer-readable storage media 1806 can use any technology for storing and retrieving information. Further, any instance of the computer-readable storage media 1806 may represent a fixed or removable unit of the computing device 1802. Further, any instance of the computer-readable storage media 1806 may provide volatile or non-volatile retention of information.

The computing device 1802 can utilize any instance of the computer-readable storage media 1806 in different ways. For example, any instance of the computer-readable storage media 1806 may represent a hardware memory unit (such as Random Access Memory (RAM)) for storing transient information during execution of a program by the computing device 1802, and/or a hardware storage unit (such as a hard disk) for retaining/archiving information on a more permanent basis. In the latter case, the computing device 1802 also includes one or more drive mechanisms 1810 (such as a hard drive mechanism) for storing and retrieving information from an instance of the computer-readable storage media 1806.

The computing device 1802 may perform any of the functions described above when the hardware processor(s) 1804 carry out computer-readable instructions stored in any instance of the computer-readable storage media 1806. For instance, the computing device 1802 may carry out computer-readable instructions to perform each block of the processes described in Section B.

Alternatively, or in addition, the computing device 1802 may rely on one or more other hardware logic units 1812 to perform operations using a task-specific collection of logic gates. For instance, the hardware logic unit(s) 1812 may include a fixed configuration of hardware logic gates, e.g., that are created and set at the time of manufacture, and thereafter unalterable. Alternatively, or in addition, the other hardware logic unit(s) 1812 may include a collection of programmable hardware logic gates that can be set to perform different application-specific tasks. The latter category of devices includes, but is not limited to Programmable Array Logic Devices (PALs), Generic Array Logic Devices (GALs), Complex Programmable Logic Devices (CPLDs), Field-Programmable Gate Arrays (FPGAs), etc.

FIG. 18 generally indicates that hardware logic circuitry 1814 includes any combination of the hardware processor(s) 1804, the computer-readable storage media 1806, and/or the other hardware logic unit(s) 1812. That is, the computing device 1802 can employ any combination of the hardware processor(s) 1804 that execute machine-readable instructions provided in the computer-readable storage media 1806, and/or one or more other hardware logic unit(s) 1812 that perform operations using a fixed and/or programmable collection of hardware logic gates. More generally stated, the hardware logic circuitry 1814 corresponds to one or more hardware logic units of any type(s) that perform operations based on logic stored in and/or otherwise embodied in the hardware logic unit(s).

In some cases (e.g., in the case in which the computing device 1802 represents a user computing device), the computing device 1802 also includes an input/output interface 1816 for receiving various inputs (via input devices 1818), and for providing various outputs (via output devices 1820). Illustrative input devices include a keyboard device, a mouse input device, a touchscreen input device, a digitizing pad, one or more static image cameras, one or more video cameras, one or more depth camera systems, one or more microphones, a voice recognition mechanism, any movement detection mechanisms (e.g., accelerometers, gyroscopes, etc.), and so on. One particular output mechanism may include a display device 1822 and an associated graphical user interface presentation (GUI) 1824. The display device 1822 may correspond to a liquid crystal display device, a light-emitting diode display (LED) device, a cathode ray tube device, a projection mechanism, etc. Other output devices include a printer, one or more speakers, a haptic output mechanism, an archival mechanism (for storing output information), and so on. The computing device 1802 can also include one or more network interfaces 1826 for exchanging data with other devices via one or more communication conduits 1828. One or more communication buses 1830 communicatively couple the above-described units together.

The communication conduit(s) 1828 can be implemented in any manner, e.g., by a local area computer network, a wide area computer network (e.g., the Internet), point-topoint connections, etc., or any combination thereof. The communication conduit(s) 1828 can include any combination of hardwired links, wireless links, routers, gateway functionality, name servers, etc., governed by any protocol or combination of protocols.

FIG. 18 shows the computing device 1802 as being composed of a discrete collection of separate units. In some cases, the collection of units may correspond to discrete hardware units provided in a computing device chassis having any form factor. FIG. 18 shows illustrative form factors in its bottom portion. In other cases, the computing device 1802 can include a hardware logic unit that integrates the functions of two or more of the units shown in FIG. 1. For instance, the computing device 1802 can include a system on a chip (SoC or SOC), corresponding to an integrated circuit that combines the functions of two or more of the units shown in FIG. 18.

The following summary provides a non-exhaustive set of illustrative aspects of the technology set forth herein.

According to a first aspect, one or more computing devices are described for performing an image-based search. The computing device(s) include hardware logic circuitry, itself including: (a) one or more hardware processors that perform operations by executing machine-readable instructions stored in a memory, and/or (b) one or more other hardware logic units that perform operations using a task-specific collection of logic gates. The operations include: receiving a selection of an input image from a user in response to manipulation of an input device by the user; extracting a first information item from the input image, the first information item representing at least one existing characteristic of the input image; providing a second information item that specifies at least one desired image characteristic; generating a query image based on the first information item and the second information item, the query image containing content that represents a combination of the at least one existing characteristic of the input image and the at least one desired image characteristic; submitting the query image to a computer-implemented search engine; receiving a set of candidate images that match the query image, as assessed by the search engine; and presenting the set of candidate images to the user using an output device.

According to a second aspect, the input image corresponds to a first input image. The first information item corresponds to a first latent variable vector associated with the first input image, and the second information item corresponds to a second latent variable vector associated with a received second input image. The operation of extracting includes using an encoder, implemented by the hardware logic circuitry, to produce the first latent variable vector based on the first input image. The operation of providing includes using an encoder, implemented by the hardware logic circuitry, to produce the second latent variable vector based on the second input image. The operations further include combining the first latent variable vector and at least the second latent variable vector to produce a mixed latent variable vector. The operation of generating includes using a decoder neural network, implemented by the hardware logic circuitry, to produce the query image based on the mixed latent variable vector, the decoder neural network operating based on parameter values provided by a generative machine-trained model.

According to a third aspect, relating to the second aspect, the operations further include: receiving textual information from the user that describes the second input image; and retrieving the second input image by performing a search based on the textual information.

According to a fourth aspect, relating to the second aspect, the first input image shows a product, and the second input image shows a desired characteristic of the product.

According to a fifth aspect, relating to the second aspect, the operation of combining includes combining the first latent variable vector and plural supplemental latent variable vectors, to produce the mixed latent variable vector. The plural supplemental latent variable vectors are associated with plural input images retrieved by performing a text-based image search. Further, the plural supplemental latent variable vectors include the second latent variable vector.

According to a sixth aspect, relating to the second aspect, the operations further include: receiving one or more weighting values in response to one or more selections made by the user by manipulating a graphical control provided by a user interface presentation; and modifying one or more latent variable vectors associated with one or more respective input images based on the one or more weighting values.

According to a seventh aspect, relating to the sixth aspect, the graphical control includes at least one slider bar.

According to an eighth aspect, relating to the sixth aspect, the graphical control includes a cursor navigation space. Different reference points on a periphery of the cursor navigation space correspond to respective input images. A weighting value to be applied to an input image is based on a position of a cursor in the cursor navigation space with respect to the reference points.

According to a ninth aspect, relating to the second aspect, the operations further include: changing one or more weighting values that are applied to one or more respective latent variable vectors associated with one or more respective input images; in response to the changing, displaying a changing representation of a generated image produced based on the one or more latent variable vectors; and receiving an instruction from the user to save a set of weighting values, the user making the instruction upon observing a desired state of the generated image.

According to a tenth aspect, relating to the second aspect, a training system produces the decoder neural network by training a generator component in a generative adversarial network.

According to an eleventh aspect, relating to the second aspect, each encoder operates by: (a) converting a given input image into a feature-space representation of the given input item; (b) using the decoder neural network to convert a candidate latent variable vector associated with the given input image into a candidate output image; (c) converting the candidate output image into a feature-space representation of the candidate output image; (d) determining a distance between the feature-space representation of the given input image and the feature-space representation of the candidate output image; (e) adjusting the candidate latent variable vector based on the distance; and repeating operations (a) through (e) plural times until an optimization objective is achieved.

According to a twelfth aspect, relating to the second aspect, each encoder is implemented using a feed-forward neural network that approximates results of a process for iteratively finding a latent variable vector.

According to a thirteenth aspect, relating to the second aspect, each encoder operates by down-sampling a given input image into a reduced-size input image.

According to a fourteenth aspect, relating to the second aspect, a training system produces each encoder and the decoder neural network by training an encoder component and a decoder component, respectively, of a variational autoencoder (VAE).

According to a fifteenth aspect, relating to the second aspect, a training system produces each encoder and the decoder neural network by training an encoder component and a decoder component, respectively, of a flow-based neural network system in which the decoder component implements an inverse of a function provided by the encoder component.

According to a sixteenth aspect, a method for performing an image-based search is described. The method includes: receiving at least a first input image and a second input image in response to selection of the first input image and the second input image by a user; using an encoder to produce a first latent variable vector based on the first input image; using an encoder to produce a second latent variable vector based on the second input image; combining at least the first latent variable vector and the second latent variable vector to produce a mixed latent variable vector; using a decoder neural network to produce a query image based on the mixed latent variable vector; submitting the query image to a computer-implemented search engine; receiving a set of candidate images that match the query image, as assessed by the search engine; and presenting the set of candidate images to the user using an output device.

According to a seventeenth aspect, relating to the sixteenth aspect, the decoder neural network operates based on parameter values provided by a generative machine-trained model.

According to an eighteenth aspect, relating to the seventeenth aspect, the generative machine-trained model is produced using a generative adversarial network.

According to a nineteenth aspect, relating to the sixteenth aspect, the method further includes receiving at least one weighting value in response to a selection made the user by interacting with a graphical control provided by a user interface presentation. The operation of combining is influenced by the at least one weighting value.

According to a twentieth aspect, a computer-readable storage medium is described for storing computer-readable instructions. The computer-readable instructions, when executed by one or more hardware processors, perform a method that includes: receiving at least a first input image and a second input image in response to selection of the first input image and the second input image by a user; using an encoder to produce a first latent variable vector based on the first input image; using an encoder to produce a second latent variable vector based on the second input image; combining the first latent variable vector and at least the second latent variable vector to produce a mixed latent variable vector; using a decoder neural network to produce a query image based on the mixed latent variable vector, a training system producing the decoder neural network by training a generator component in a generative adversarial network; submitting the query image to a computer-implemented search engine; receiving a set of candidate images that match the query image, as assessed by the search engine; and presenting the set of candidate images to the user using an output device.

A twenty-first aspect corresponds to any combination (e.g., any logically consistent permutation or subset) of the above-referenced first through twentieth aspects.

A twenty-second aspect corresponds to any method counterpart, device counterpart, system counterpart, means-plus-function counterpart, computer-readable storage medium counterpart, data structure counterpart, article of manufacture counterpart, graphical user interface presentation counterpart, etc. associated with the first through twenty-first aspects.

In closing, the functionality described herein can employ various mechanisms to ensure that any user data is handled in a manner that conforms to applicable laws, social norms, and the expectations and preferences of individual users. For example, the functionality can allow a user to expressly opt in to (and then expressly opt out of) the provisions of the functionality. The functionality can also provide suitable security mechanisms to ensure the privacy of the user data (such as data-sanitizing mechanisms, encryption mechanisms, password-protection mechanisms, etc.).

Further, the description may have set forth various concepts in the context of illustrative challenges or problems. This manner of explanation is not intended to suggest that others have appreciated and/or articulated the challenges or problems in the manner specified herein. Further, this manner of explanation is not intended to suggest that the subject matter recited in the claims is limited to solving the identified challenges or problems; that is, the subject matter in the claims may be applied in the context of challenges or problems other than those described herein.

Although the subject matter has been described in language specific to structural features and/or methodological acts, it is to be understood that the subject matter defined in the appended claims is not necessarily limited to the specific features or acts described above. Rather, the specific features and acts described above are disclosed as example forms of implementing the claims.

What is claimed is:

1. One or more computing devices for performing an image-based search, comprising:
    hardware logic circuitry including: (a) one or more hardware processors that perform operations by executing machine-readable instructions stored in a memory, and/or (b) one or more other hardware logic units that perform the operations using a task-specific collection of logic gates, the operations including:
    receiving a selection of an input image from a user in response to manipulation of an input device by the user;
    extracting a first information item from the input image, the first information item representing at least one existing characteristic of the input image;
    producing a second information item that specifies at least one desired image characteristic;
    generating a query image based on the first information item and the second information item, the query image containing content that represents a combination of said at least one existing characteristic of the input image and said at least one desired image characteristic;
    submitting the query image to a computer-implemented search engine;
    receiving a set of candidate images that match the query image, as assessed by the search engine; and
    presenting the set of candidate images to the user using an output device,
    wherein the input image corresponds to a first input image,
    wherein the first information item corresponds to a first latent variable vector associated with the first input image, and the second information item corresponds to a second latent variable vector associated with a received second input image, wherein said extracting comprises using a first encoder, implemented by the hardware logic circuitry, to produce the first latent variable vector based on the first input image, wherein said producing comprises using a second encoder, implemented by the hardware logic circuitry, to produce the second latent variable vector based on the second input image, wherein the operations further include combining the first latent variable vector and at least the second latent variable vector to produce a mixed latent variable vector, and wherein said generating comprises using a decoder neural network, implemented by the hardware logic circuitry, to produce the query image based on the mixed latent variable vector, the decoder neural network operating based on parameter values provided by a machine-trained model, the query image being synthesized by the decoder neural network by mapping the mixed latent variable vector into the query image using the machine-trained model, rather than selecting the query image from a data store of real preexisting images.

2. The one or more computing devices of claim 1, wherein the operations further include:
receiving textual information from the user that describes the second input image; and
retrieving the second input image by performing a search based on the textual information.

3. The one or more computing devices of claim 1, wherein the first input image shows a product, and the second input image shows a desired characteristic of the product.

4. The one or more computing devices of claim 1,
wherein said combining includes combining the first latent variable vector and plural supplemental latent variable vectors, to produce the mixed latent variable vector,
the plural supplemental latent variable vectors being associated with plural input images retrieved by performing a text-based image search,
the plural supplemental latent variable vectors including the second latent variable vector.

5. The one or more computing devices of claim 1, wherein the operations further comprise:
receiving one or more weighting values in response to one or more selections made by the user by manipulating a graphical control provided by a user interface presentation; and
modifying one or more latent variable vectors associated with one or more respective input images based on said one or more weighting values,
wherein the graphical control includes a cursor navigation space,
wherein plural reference points on a periphery of the cursor navigation space correspond to respective input images, and
wherein a weighting value to be applied to a particular input image associated with a particular reference point is based on a position of a cursor in the cursor navigation space with respect to at least the particular reference point.

6. The one or more computing devices of claim 1, wherein the operations further include:
changing one or more weighting values that are applied to one or more respective latent variable vectors associated with one or more respective input images;

in response to said changing, displaying a changing representation of a generated image produced by the decoder neural network based on said one or more latent variable vectors; and
receiving an instruction from the user to save a set of weighting values, the user making the instruction upon observing a desired state of the generated image.

7. The one or more computing devices of claim 1, wherein a training system produces the decoder neural network by training a generator component in a generative adversarial network, to produce the machine-trained model.

8. The one or more computing devices of claim 1, wherein each encoder operates by performing, at least once:
(a) converting a given input image into a feature-space representation of the given input image;
(b) using the decoder neural network to convert a candidate latent variable vector associated with the given input image into a candidate output image;
(c) converting the candidate output image into a feature-space representation of the candidate output image;
(d) determining a distance between the feature-space representation of the given input image and the feature-space representation of the candidate output image; and
(e) adjusting the candidate latent variable vector based on the distance.

9. The one or more computing devices of claim 1, wherein each encoder is implemented using a feed-forward neural network that approximates results of a process for iteratively finding a latent variable vector.

10. The one or more computing devices of claim 1, wherein each encoder operates by down-sampling a given input image into a reduced-size input image.

11. The one or more computing devices of claim 1, wherein a training system produces each encoder and the decoder neural network by training an encoder component and a decoder component, respectively, of a variational autoencoder (VAE).

12. The one or more computing devices of claim 1, wherein a training system produces each encoder and the decoder neural network by training an encoder component and a decoder component, respectively, of a flow-based neural network system in which the decoder component implements an inverse of a function provided by the encoder component.

13. A method for performing an image-based search, comprising:
receiving at least a first input image and a second input image in response to selection of the first input image and the second input image by a user;
using a first encoder to produce a first latent variable vector based on the first input image;
using a second encoder to produce a second latent variable vector based on the second input image;
combining the first latent variable vector and at least the second latent variable vector to produce a mixed latent variable vector;
using a decoder neural network to generate a query image based on the mixed latent variable vector, wherein the query image corresponds to a synthetic image that the decoder neural network produces by mapping the mixed latent variable vector into the query image using a machine-trained model, rather than selecting the query image from a data store of real preexisting images;
submitting the query image to a computer-implemented search engine;

receiving a set of candidate images that match the query image, as assessed by the search engine; and presenting the set of candidate images to the user using an output device.

14. The method of claim 13, wherein the machine-trained model is a generative machine-trained model.

15. The method of claim 14, wherein the generative machine-trained model is produced using a generative adversarial network.

16. A computer-readable storage medium for storing computer-readable instructions, the computer-readable instructions, when executed by one or more hardware processors, performing a method that comprises:

receiving at least a first input image and a second input image in response to selection of the first input image and the second input image by a user;

using a first encoder to produce a first latent variable vector based on the first input image;

using a second encoder to produce a second latent variable vector based on the second input image;

combining the first latent variable vector and at least the second latent variable vector to produce a mixed latent variable vector;

using a decoder neural network to generate a query image based on the mixed latent variable vector, wherein the query image corresponds to a synthetic image that the decoder neural network produces by mapping the mixed latent variable vector into the query image using a machine-trained model, rather than selecting the query image from a data store of real preexisting images, a training system producing the machine-trained model by training a generator component in a generative adversarial network;

submitting the query image to a computer-implemented search engine;

receiving a set of candidate images that match the query image, as assessed by the search engine; and presenting the set of candidate images to the user using an output device.

17. The one or more computing devices of claim 1, wherein the synthetic image has no counterpart preexisting image.

18. The one or more computing devices of claim 5, wherein the cursor navigation space defines a shape having positions that are describable using at least two dimensions, and wherein the graphical control is configured to allow the user to move the cursor to any position within the shape.

19. A method for performing an image-based search, comprising:

receiving a selection of an input image from a user in response to manipulation of an input device by the user;

encoding the input image into a first representation that represents at least one existing characteristic of the input image;

encoding another image into a second representation that represents at least one desired image characteristic;

combining the first representation and the second representation into a combined representation;

using a decoder neural network to synthesize a query image by mapping the combined representation into the query image using a machine-trained model, rather than selecting the query image from a data store of real preexisting images, the query image containing content that represents a combination of said at least one existing characteristic of the input image and said at least one desired image characteristic;

displaying the query image that is synthesized;

receiving one or more weighting values in response to one or more selections made by the user by manipulating a graphical control provided by a user interface presentation;

producing another combined representation that takes into account said one or more weighting values;

using the decoder neural network to synthesize a modified query image by mapping the other combined representation into the modified query image using the machine-trained model of the decoder neural network, rather than selecting the modified query image from the data store of real preexisting images;

displaying the modified query image;

submitting the modified query image to a computer-implemented search engine;

receiving a set of candidate images that match the modified query image, as assessed by the search engine; and presenting the set of candidate images to the user using an output device.

* * * * *